United States Patent
Sato

(10) Patent No.: US 11,441,015 B2
(45) Date of Patent: Sep. 13, 2022

(54) COATED PARTICLE

(71) Applicant: AJINOMOTO CO., INC., Chuo-ku (JP)

(72) Inventor: Eriko Sato, Kawasaki (JP)

(73) Assignee: AJINOMOTO CO., INC., Chuo-ku (JP)

( * ) Notice: Subject to any disclaimer, the term of this patent is extended or adjusted under 35 U.S.C. 154(b) by 146 days.

(21) Appl. No.: 16/925,436

(22) Filed: Jul. 10, 2020

(65) Prior Publication Data

US 2020/0339782 A1 Oct. 29, 2020

Related U.S. Application Data

(63) Continuation of application No. PCT/JP2019/000642, filed on Jan. 11, 2019.

(30) Foreign Application Priority Data

Jan. 12, 2018 (JP) .............................. JP2018-003168

(51) Int. Cl.
| | | |
|---|---|---|
| *C08K 5/55* | (2006.01) | |
| *C08K 9/10* | (2006.01) | |
| *C08G 59/40* | (2006.01) | |
| *C08K 3/22* | (2006.01) | |
| *C09J 11/06* | (2006.01) | |
| *C09J 163/00* | (2006.01) | |

(52) U.S. Cl.
CPC ................ *C08K 9/10* (2013.01); *C08G 59/40* (2013.01); *C08K 3/22* (2013.01); *C08K 5/55* (2013.01); *C09J 11/06* (2013.01); *C09J 163/00* (2013.01); *C08G 2170/00* (2013.01); *C08K 2003/2237* (2013.01)

(58) Field of Classification Search
CPC ... C08K 9/10; C08K 3/22; C08K 5/55; C08K 2003/2327; C08G 59/40; C08G 2170/00; C08G 59/4021; C08G 59/188; C09J 11/06; C09J 163/00; C09J 11/00
USPC ........................................................ 523/204
See application file for complete search history.

(56) References Cited

U.S. PATENT DOCUMENTS 10,450,407 B2 * 10/2019 Tanaka ................ C08G 59/5073
2008/0280103 A1 * 11/2008 Uetsuka .................... C08J 7/043
427/372.2
2017/0137563 A1 5/2017 Tanaka et al.

FOREIGN PATENT DOCUMENTS

| JP | 62-141083 A | 6/1987 |
|---|---|---|
| JP | 1-113480 A | 5/1989 |
| JP | 4-6116 B | 2/1992 |
| JP | 5-43661 A | 2/1993 |
| JP | 5-295329 A | 11/1993 |
| JP | 6-136244 A | 5/1994 |
| JP | 7-304931 A | 11/1995 |
| JP | 8-64960 A | 3/1996 |
| JP | 10-237410 A | 9/1998 |
| JP | 11-323247 A | 11/1999 |
| JP | 2000-3987 A | 1/2000 |
| JP | 2002-226675 A | 8/2002 |
| JP | 2003-246838 A | 9/2003 |
| JP | 2004-315572 A | 11/2004 |
| JP | 2005-113103 A | 4/2005 |
| JP | 2005-222037 A | 8/2005 |
| JP | 2009-102563 A | 5/2009 |
| JP | 2010-100730 A | 5/2010 |
| JP | 2013-18804 A | 1/2013 |
| JP | 2016-153513 A | 8/2016 |

OTHER PUBLICATIONS

International Search Report dated Feb. 26, 2019 in PCT/JP2019/000642.

* cited by examiner

*Primary Examiner* — Hannah J Pak
(74) *Attorney, Agent, or Firm* — Oblon, McClelland, Maier & Neustadt, L.L.P.

(57) ABSTRACT

Provided is a urea compound-containing epoxy resin curing agent particle that can impart excellent storage stability and heat stability to an epoxy resin composition including a urea compound as a curing agent, while maintaining the solubility of the urea compound during heating and the fluidity after dissolution of the urea compound. The surface of the urea compound-containing epoxy resin curing agent particle is coated with a Group 4 or Group 13 element-containing alkoxide compound, chelate compound, and/or acylate compound.

17 Claims, No Drawings

COATED PARTICLE

TECHNICAL FIELD

The present invention relates to a coated particle that is a urea compound-containing epoxy resin curing agent particle having a surface coated with a specific compound containing a Group 4 or Group 13 element and relates to, for example, an epoxy resin composition including the coated particle.

BACKGROUND ART

When an epoxy resin composition including a solid epoxy resin curing agent is used as, for example, an adhesive, in order to make the epoxy resin composition a stable single liquid agent, the epoxy resin curing agent is required to have sufficient latency. Here, the term "latency" refers not to a property of acting as a curing agent at an ordinary temperature but to a property of acting as a curing agent when heated. If the latency of a solid epoxy resin curing agent is insufficient, the curing reaction of the epoxy resin progresses at an ordinary temperature to cause problems of storage stability such as an increase in the viscosity of the epoxy resin composition.

For example, as a method for improving the storage stability of an epoxy resin composition including a latent curing agent, a method for treating a curing agent with a silane coupling agent, such as glycidoxypropyltrimethoxysilane, is known (Patent Literature 1). In addition, as another method, for example, a method of coating the surface of a latent curing agent with a silicone alkoxy oligomer is known (Patent Literature 2). However, these methods are not necessarily sufficient in the effect of storage stability, and further improvement is required.

For example, an adhesive that is used in an automobile assembly process may be exposed to a relatively high temperature that is lower than the curing temperature after the application of the adhesive and before the curing process, and in such a case, it is necessary that the adhesive have heat stability that prevents the progression of curing of the epoxy resin. In addition, as a structural adhesive, a hot melt adhesive, which has a high viscosity at room temperature but flows when heated within a range lower than the curing temperature, may be used. In such a case, the adhesive is required to have heat stability so that the adhesive can be stably treated when heated for reducing the viscosity in application.

In addition, a curing agent that is used in, for example, fiber-reinforced thermosetting plastic is required to dissolve in a matrix resin and penetrate into the details of fibers during curing in order to achieve uniform curing. It is known that among latent curing agents, in particular, urea compounds have excellent solubility in epoxy resins and the like during heating for curing, and such an epoxy resin or the like has fluidity for a certain time also after dissolution in a urea compound. In addition, when a urea compound is used together with dicyandiamide, which is a curing agent that is widely used in, for example, fiber-reinforced thermosetting plastic, the urea compound acts as a curing accelerator, can decrease the curing temperature (about 180° C.) of dicyandiamide down to about 120° C., and improves the solubility of dicyandiamide being inferior in solubility to achieve uniform curing. However, since the epoxy resin composition including a urea compound as a curing agent has extremely low storage stability, improvement is highly demanded.

CITATION LIST

Patent Literature

Patent Literature 1: Japanese Unexamined Patent Application Publication No. 2005-222037
Patent Literature 2: Japanese Unexamined Patent Application Publication No. 2016-153513

SUMMARY OF INVENTION

Technical Problem

It is an object of the present invention to provide a urea compound-containing epoxy resin curing agent particle that can impart excellent storage stability and heat stability to an epoxy resin composition including a urea compound as a curing agent while maintaining the solubility of the urea compound during heating and the fluidity after dissolution of the urea compound.

Solution to Problem

The present inventors have intensively studied to solve the above problems and, as a result, have found that an epoxy resin composition having not only excellent storage stability but also excellent heat stability can be obtained while maintaining the solubility of the urea compound during heating and the fluidity after dissolution of the urea compound by coating the surface of a urea compound-containing epoxy resin curing agent particle with a specific compound containing a Group 4 or Group 13 element and have accomplished the present invention. That is, the present invention includes the following aspects:

[1] A coated particle including: a urea compound-containing epoxy resin curing agent particle (A) and a Group 4 or Group 13 element-containing compound (B) coating the surface of the particle, wherein the compound containing a Group 4 or Group 13 element is at least one selected from the group consisting of alkoxide compounds, chelate compounds, and acylate compounds;

[2] The coated particle according to aspect [1], wherein the Group 4 or Group 13 element in the Group 4 or Group 13 element-containing compound (B) is selected from the group consisting of boron, aluminum, titanium, and zirconium;

[3] The coated particle according to aspect [2], wherein the Group 4 or Group 13 element in the Group 4 or Group 13 element-containing compound (B) is boron or titanium;

[4] The coated particle according to any one of aspects [1] to [3], wherein the urea compound (A) is at least one selected from the group consisting of aromatic dimethylureas and aliphatic dimethylureas;

[5] The coated particle according to any one of aspects [1] to [4], wherein
the Group 4 or Group 13 element-containing compound (B) includes
(a) a compound represented by formula (1): $D(OR^1)_n$ (in formula (1),
D is a Group 4 or Group 13 element,
when D is a Group 4 element, n is 4,
when D is a Group 13 element, n is 3, and
in n OR's, independently,
(i) $R^1$ is a linear or branched saturated or unsaturated C1-20 hydrocarbon group, (ii) R¹ is an acyl group represented by formula (1a): COR² (in formula (1a), R² is a linear or branched saturated or unsaturated C1-20 hydrocarbon group), or (iii) R¹ is a group represented by formula (1b): R³C(O)R⁴ (in formula (1b), R³ is a linear or branched saturated or unsaturated C1-4 hydrocarbon group, and R⁴ is R⁵ or OR⁵, where R⁵ is a linear or branched saturated or unsaturated C1-20 hydrocarbon group); and OR¹ is coordinate-bonded to D through a carbonyl group in the formula (1b) to form the following cyclic structure (1c):

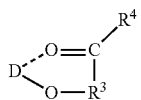

(1c)

(in formula (1c), the dotted line indicates a coordinate bond));

(b) a compound represented by the following formula (2):

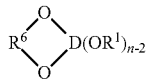

(2)

(in formula (2), D, n, and R¹ are the same as those defined in formula (1), and R⁶ is a linear or branched saturated or unsaturated C1-20 hydrocarbon group); or (c) a 2- to 10-mer of a compound represented by the formula (1) and/or a compound represented by the formula (2);

[6] The coated particle according to any one of aspects [1] to [5], wherein
the cyclic structure (1c) is represented by the following cyclic structure (1d):

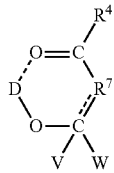

(1d)

(in the formula,
R⁷ is a single bond or a linear or branched saturated or unsaturated C1-3 hydrocarbon group that is optionally substituted with one or more R⁹s, where R⁸ is a linear or branched saturated or unsaturated C1-20 hydrocarbon group,
V is R⁹ or OR⁹, where R⁹ is a hydrogen atom or a linear or branched saturated or unsaturated C1-20 hydrocarbon group, and means a single bond or a double bond, where when ⁓⁓⁓⁓⁓⁓⁓ means a single bond, W is R⁹ or OR⁹, and when ⁓⁓⁓⁓⁓⁓⁓ means a double bond, W is not present);

[7] An epoxy resin composition including the coated particle according to any one of aspects [1] to [6] and an epoxy resin;

[8] An adhesive including the epoxy resin composition according to aspect [7];

[9] A method for manufacturing the coated particle according to any one of aspects [1] to [6], the method including a step of mixing a urea compound-containing epoxy resin curing agent particle (A) and at least one selected from the group consisting of Group 4 or Group 13 element-containing alkoxide, chelate, and acylate compounds (B); and

[10] A method for coating an epoxy resin curing agent particle, the method including a step of coating the surface of a urea compound-containing epoxy resin curing agent particle (A) with at least one selected from the group consisting of Group 4 or Group 13 element-containing alkoxide, chelate, and acylate compounds (B).

Advantageous Effects of Invention

The present invention provides a urea compound-containing epoxy resin curing agent particle that can impart excellent storage stability and heat stability to an epoxy resin composition including a urea compound as a curing agent, while maintaining the solubility of the urea compound during heating and the fluidity after dissolution of the urea compound.

DESCRIPTION OF EMBODIMENTS

The present invention relates to a coated particle including a urea compound-containing epoxy resin curing agent particle (A) and a Group 4 or Group 13 element-containing compound (B) coating the surface of the particle, wherein the compound containing a Group 4 or Group 13 element is at least one selected from the group consisting of alkoxide compounds, chelate compounds, and acylate compounds.

<Urea Compound-Containing Epoxy Resin Curing Agent Particle (A)>

The urea compound-containing epoxy resin curing agent particle (A) according to the present invention is preferably a latent curing agent. The term "latent" refers not to a property of acting as a curing agent at an ordinary temperature (25° C.), but acting as a curing agent when heated to, for example, 100° C. The urea compound-containing epoxy resin curing agent particle (A) includes at least one urea compound and may further include at least one other latent curing agent selected from the group consisting of, for example, dicyandiamide, hydrazide compounds, and amine-based latent curing agents. The content of the urea compound in the urea compound-containing epoxy resin curing agent particle (A) is preferably 30 mass % or more, more preferably 50 mass % or more, more preferably 75 mass % or more, more preferably 90 mass % or more, and particularly preferably 100 mass %, when the amount of the epoxy resin curing agent particle is defined as 100 mass %.

The urea compound-containing epoxy resin curing agent particle (A) may be used together with the above-mentioned latent curing agent and/or a curing agent other than the above-mentioned latent curing agent. The urea compound-containing epoxy resin curing agent particle (A) that is used together with another curing agent acts as a curing accelerator in some cases. That is, the term "epoxy resin curing agent" in the present invention is a concept including an epoxy resin curing accelerator.

In addition, the urea compound may be any compound that has a urea group and can react with an epoxy resin, and preferable examples thereof include aromatic dimethylureas and aliphatic dimethylureas. Preferable examples of the aromatic dimethylurea include N,N-dimethyl-N'-phenylurea, N,N-dimethyl-N'-(3,4-dichlorophenyl)urea, 4,4'-methylene bis(phenyl dimethylurea), and toluene bis dimethylurea. Preferable examples of the aliphatic dimethylurea include dimethyl aminocarboxyl aminomethyl trimethyl cyclohexyl dimethylurea.

The dicyandiamide as the optional latent curing agent is preferably dicyandiamide or its polyepoxide modified product, amidation product, Mannich-modified product, or Michael addition product.

The hydrazide compound as the optional latent curing agent is preferably carbodihydrazide, malonic acid dihydrazide, succinic acid dihydrazide, adipic acid dihydrazide, sebacic acid dihydrazide, dodecanedioic acid hydrazide, isophthalic acid dihydrazide, or salicylic acid dihydrazide.

The amine-based latent curing agent as the optional latent curing agent is preferably at least one amine-based latent curing agent selected from the group consisting of imidazole compounds, salts of imidazole and an acidic compound, amine compounds, salts of an amine compound and an acidic compound, primary amine-adduct latent curing agents, secondary amine-adduct latent curing agents, tertiary amine-adduct latent curing agents, and imidazole-adduct latent curing agents.

The amine-adduct latent curing agent as the optional latent curing agent may be any compound that is obtained by a reaction of a compound having a primary, secondary, or tertiary amino group and a compound capable of reacting with such a compound. Examples of the compound to be reacted with the compound having an amino group include epoxy compounds, urea, isocyanate, and acid anhydrides.

Preferable examples of the compound having an amino group include dimethylaminopropylamine, diethylaminopropylamine, di-n-propylaminopropylamine, dibutylaminopropylamine, dimethylaminoethylamine, diethylaminoethylamine, N-methylpiperazine, N-aminoethylpiperazine, 1,4-bis(3-aminopropyl)piperazine, 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, dimethylaminomethylphenol, 2,4,6-tris(dimethylaminomethyl)phenol, N-β-hydroxyethylmorpholine, 2-dimethylaminoethanethiol, 1,4-diazabicyclo[2.2.2]octane, N,N-dimethyl-N'-phenylurea, N,N-dimethyl-N'-(3,4-dichlorophenyl)urea, toluene bis(dimethylurea), 4,4'-methylene bis(phenyl dimethylurea), 2-mercaptopyridine, 2-mercaptopyridine, N,N-dimethylaminobenzoic acid, N,N-dimethylglycine, nicotinic acid, isonicotinic acid, picolinic acid, N,N-dimethylglycine hydrazide, N,N-dimethylpropionic acid hydrazide, nicotinic acid hydrazide, and isonicotinic acid hydrazide.

Preferable examples of the epoxy compound that is used as a raw material for manufacturing the amine-adduct latent curing agent include, but are not limited to, polyglycidyl ethers obtained by a reaction of a polyphenol, such as bisphenol A, bisphenol F, catechol, or resorcinol, or a polyalcohol, such as glycerol or polyethylene glycol, with epichlorohydrin; glycidyl ether esters obtained by a reaction of a hydroxycarboxylic acid, such as p-hydroxybenzoic acid or β-hydroxynaphthoic acid, with epichlorohydrin; polyglycidyl esters obtained by a reaction of a polycarboxylic acid, such as phthalic acid or terephthalic acid, with epichlorohydrin; glycidyl amine compounds obtained by a reaction of 4,4'-diaminodiphenyl methane, m-aminophenol, or the like with epichlorohydrin; multifunctional epoxy compounds, such as epoxidized phenol novolac resin, epoxidized cresol novolac resin, and epoxidized polyolefin; and monofunctional epoxy compounds, such as butyl glycidyl ether, phenyl glycidyl ether, and glycidyl methacrylate.

Examples of the isocyanate that is used as a raw material for manufacturing the amine-adduct latent curing agent include lene diisocyanate, m-tetramethylxylylene diisocyanate, 4,4-diphenylmethane diisocyanate, tolylene diisocyanate, bis-chloromethyl-diphenylmethane-diisocyanate, 2,6-diisocyanate-benzyl chloride, butane-1,4-diisocyanate, hexamethylene diisocyanate, isopropylene diisocyanate, methylene diisocyanate, 2,2,4-trimethylhexamethylene diisocyanate, cyclohexane-1,4-diisocyanate, isophorone diisocyanate, dimethylcyclohexyl diisocyanate, methylcyclohexyl diisocyanate, dicyclohexylmethane-4,4'-diisocyanate, 1,3-bis(isocyanatemethyl)cyclohexane, methylcyclohexane diisocyanate, and norbornane diisocyanate.

Examples of the acid anhydride that is used as a raw material for manufacturing the amine-adduct latent curing agent include phthalic anhydride, trimellitic anhydride, pyromellitic anhydride, benzophenone tetracarboxylic anhydride, maleic anhydride, succinic anhydride, tetrahydrophthalic anhydride, methyl tetrahydrophthalic anhydride, methyl nadic anhydride, alkenyl succinic anhydride, hexahydrophthalic anhydride, methyl hexahydrophthalic anhydride, methyl cyclohexene tetracarboxylic anhydride, polyadipic anhydride, polyazelaic anhydride, and polysebacic anhydride.

In the manufacturing of the amine-adduct latent curing agent, as other components, for example, an active hydrogen compound having active hydrogen in its molecule, diisocyanate, a monoamine compound, a diamine compound, and urea can be used. Examples of the active hydrogen compound include polyphenols, such as bisphenol A, bisphenol F, bisphenol S, hydroquinone, catechol, resorcinol, pyrogallol, and phenol novolac resin; polyalcohols, such as trimethylolpropane; multivalent carboxylic acids, such as adipic acid and phthalic acid; and 1,2-dimercaptoethane, 2-mercaptoethanol, 1-mercapto-3-phenoxy-2-propanol, mercaptoacetic acid, anthranilic acid, and lactic acid. Examples of the diisocyanate include isophorone diisocyanate, metaxylylene diisocyanate, 1,3-bis(isocyanatomethyl)cyclohexane, 2,4-toluylene diisocyanate, 2,6-toluylene diisocyanate, 1,5-naphthylene diisocyanate, 1,4-phenylene diisocyanate, diphenylmethane-4,4'-diisocyanate, 2,2'-dimethyldiphenylmethane-4,4'-diisocyanate, hexamethylene diisocyanate, and trimethylhexamethylene diisocyanate. Examples of the monoamine compound include butylamine, isobutylamine, sec-butylamine, 1,2-butylamine, 1,2-dimethylpropylamine, hexylamine, 2-ethylhexylamine, benzylamine, and cyclohexylamine. Examples of the diamine compound include methaxylylenediamine, 1,3-bisaminomethylcyclohexane, isophoronediamine, diaminocyclohexane, phenylenediamine, toluylenediamine, diaminodiphenylmethane, diaminodiphenylsulfone, hexamethylenediamine, ethylenediamine, propylenediamine, diaminobutane, 1,12-dodecanediamine, piperazine, and N-aminoethylpiperazine.

The amine-adduct latent curing agent can be easily prepared by, for example, a method of mixing the above-mentioned compound containing an amino group, an epoxy compound, and other optional components as necessary, reacting them within a temperature range of room temperature (25° C.) to 250° C., and then performing solidification and pulverization; or a method of reacting a mixture of the above-mentioned components in a solvent, such as methyl ethyl ketone, dioxane, or tetrahydrofuran, removing the solvent, and then pulverizing the solid content.

The imidazole-adduct latent curing agent as the optional latent curing agent is a compound that is obtained by a reaction of an imidazole compound and a compound capable of reacting with the imidazole compound.

Examples of the imidazole compound include 2-ethyl-4-methylimidazole, 2-methylimidazole, 2-ethyl-4-methylimidazoline, 2,4-dimethylimidazoline, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, and 1-(2-hydroxy-3-butoxypropyl)-2-methylimidazoline.

Examples of the compound capable of reacting with an imidazole compound include epoxy compounds, urea, isocyanate, and acid anhydrides that are also used as raw materials for manufacturing the amine-adduct latent curing agent. In the manufacturing of the imidazole-adduct latent curing agent, another component can be used as needed.

The urea compound and the optionally present latent curing agent in the epoxy resin curing agent particle of the present invention may be further subjected to surface treatment. In the surface treatment, for example, an isocyanate compound or an acidic compound is preferably used. Preferable examples of the isocyanate compound that is used as the surface treatment agent include monofunctional isocyanate compounds, such as n-butyl isocyanate, isopropyl isocyanate, phenyl isocyanate, and benzyl isocyanate; multifunctional isocyanate compounds, such as hexamethylene diisocyanate, toluylene diisocyanate, 1,5-naphthalene diisocyanate, diphenylmethane 4,4'-diisocyanate, isophorone diisocyanate, xylene diisocyanate, paraphenylene diisocyanate, 1,3,6-hexamethylene triisocyanate, and bicycloheptane triisocyanate; and terminal isocyanate group-containing compounds that are obtained by a reaction of the multifunctional isocyanate compound and an active hydrogen compound.

Preferable examples of the terminal isocyanate group-containing compound include terminal isocyanate group-containing addition reaction products that are obtained by a reaction of toluylene diisocyanate and trimethylolpropane and terminal isocyanate group-containing addition reaction products that are obtained by a reaction of toluylene diisocyanate and pentaerythritol.

Preferable examples of the acidic compound that is used as the surface treatment agent include gas or liquid inorganic or organic acids. Preferable examples of the acidic compound include carbon dioxide gas, sulfurous acid gas, sulfuric acid, hydrochloric acid, oxalic acid, phosphoric acid, acetic acid, formic acid, propionic acid, adipic acid, caproic acid, lactic acid, succinic acid, tartaric acid, sebacic acid, p-toluenesulfonic acid, salicylic acid, boric acid, tannic acid, alginic acid, polyacrylic acid, polymethacrylic acid, phenol, pyrogallol, phenolic resin, and resorcinol resin.

The surface treatment of a urea compound and an optional latent curing agent can be performed by, for example, bringing a latent curing agent into contact with the isocyanate compound or acidic compound in a solvent, such as methyl ethyl ketone or toluene, or in the absence of solvent.

The urea compound-containing epoxy resin curing agent particle (A) is not particularly limited and is, for example, a particle having an average particle diameter of 0.5 to 300 µm. The average particle diameter is preferably to 200 µm, more preferably 1.5 to 100 µm, further preferably 2 to 50 µm, and even further preferably 2.5 to 25 µm. In the present specification, the average particle diameter means a particle diameter (median diameter) that is a 50% cumulative diameter from the fine particle side of the cumulative particle size distribution measured by a laser diffraction particle size analyzer (SALD-2200, manufactured by Shimadzu Corporation), unless otherwise specified. When a part of the particles in a measurement sample is aggregated, the measured value of average particle diameter reflects not only the diameter of each particle, but also the diameter of the aggregate. When the average particle diameter of the urea compound-containing epoxy resin curing agent particle (A) is 0.5 µm or more, the coated particle has sufficient latency, and thus it is possible to prevent the reaction of the urea compound-containing epoxy resin curing agent particle (A) with an epoxy resin from starting at an ordinary temperature. In addition, when the average particle diameter of the urea compound-containing epoxy resin curing agent particle (A) is 300 µm or less, streaks due to catch of the coated particle are prevented from occurring, the epoxy resin composition containing the coated particle according to the present invention can be evenly applied, and the epoxy resin composition can bond or permeate narrower gaps.

The urea compound-containing epoxy resin curing agent particle (A) having a desired particle diameter can be obtained by appropriately pulverizing coarse particles of an epoxy resin curing agent with, for example, a jet mill, a ball mill, an attritor, or a bead mill, and arbitrarily performing classification with, for example, a classifier such as an air separator, a cyclone, or a sieve.

The urea compound-containing epoxy resin curing agent particle (A) may be a commercial product. Examples of commercially available urea compound include N,N-dimethyl-N'-phenylurea (Technicure PDU-250M, manufactured by A&C Catalysts, Inc.), N,N-dimethyl-N'-(3,4-dichlorophenyl)urea (Technicure DCMU, manufactured by A&C Catalysts, Inc.), 4,4'-methylene bis(phenyl dimethylurea) (Technicure MDU-11M, manufactured by A&C Catalysts, Inc.), an aromatic dimethylurea compound (U-CAT3512T, manufactured by San-Apro Ltd.), toluene bis dimethylurea (Technicure TDU-200M, manufactured by A&C Catalysts, Inc.), dimethyl aminocarboxyl aminomethyl trimethyl cyclohexyl dimethylurea (Technicure IPDU-8, manufactured by A&C Catalysts, Inc.), DYHARD UR200 (manufactured by AlzChem AG), DCMU-99 (manufactured by Hodogaya Chemical Co., Ltd.), and OMICURE U-210M, U-24, U-24M, U-52, U-52M, 94, U-35, U-35M, U-405, U-405M, U-410, and U-410M (manufactured by CVC Specialty Chemicals Inc.).

Examples of commercially available dicyandiamide include DICY7, DICY15, and DICY50 manufactured by Mitsubishi Chemical Corporation; DYHARD03, 03S, 100S, 100SH, and 100SF manufactured by AlzChem AG; and dicyandiamide manufactured by Nippon Carbide Industries Co., Ltd.

Examples of commercially available hydrazide compounds include Amicure VDH, VDH-J, UDH, and UDH-J manufactured by Ajinomoto Fine-Techno Co., Ltd.; CDH, MDH, SUDH, ADH, SDH, N-12, and IDH manufactured by Japan Finechem Company, Inc.; and ADH, SDH, DDH, IDH, and SAH manufactured by Otsuka Chemical Co., Ltd.

Examples of commercially available amine-based latent curing agents include imidazole-adduct latent curing agents (for example, Amicure PN-23, Amicure PN-23J, Amicure PN-31, Amicure PN-31J, Amicure PN-40, Amicure PN-40J, Amicure PN-50, Amicure PN-50J, and Amicure PN-H manufactured by Ajinomoto Fine-Techno Co., Ltd.; Adeka Hardener EH3293S, Adeka Hardener EH3366S, and Adeka Hardener EH4346S manufactured by Adeka Corporation; Sunmide LH210 manufactured by Air Products and Chemicals, Inc.; and FXR-1121 manufactured by T&K TOKA Co., Ltd.) and tertiary amine-adduct latent curing agents (for example, Amicure MY-24, Amicure MY-25, Amicure MY-H, Amicure MY-24J, and Amicure MY-HK-1 manufactured by Ajinomoto Fine-Techno Co., Ltd.; EH4380S, EH3616S, EH5001P, EH4357S, and EH3615S manufactured by Adeka Corporation; and FXR-1020 and FXR-1081 manufactured by T&K TOKA Co., Ltd.).

When the amount of the coated particle is defined as 100 mass %, the amount of the urea compound-containing epoxy resin curing agent particle (A) contained in the coated particle is preferably 60.0 to 99.9 mass %, more preferably 70.0 to 99.7 mass %, and further preferably 80.0 to 99.5 mass % from the viewpoint of the storage stability and the heat stability of the epoxy resin composition containing the coated particle.

<Group 4 or Group 13 Element-Containing Compound (B)>

The Group 4 or Group 13 element in the Group 4 or Group 13 element-containing compound (B) of the present invention is preferably selected from the group consisting of boron, aluminum, titanium, and zirconium, and is more preferably boron or titanium.

The Group 4 or Group 13 element-containing compound (B) is at least one selected from the group consisting of alkoxide compounds, chelate compounds, and acylate compounds. The Group 4 or Group 13 element-containing compound (B) of the present invention may include a compound represented by the following formula (1), a compound represented by the following formula (2), or a 2- to 10-mer thereof; preferably a compound represented by the following formula (1), a compound represented by the following formula (2), or a 2- to 5-mer thereof; and more preferably a compound represented by the following formula (1) or a compound represented by the following formula (2).

$$D(OR^1)_n \quad (1)$$

In the formula (1),

D is a Group 4 or Group 13 element, when D is a Group 4 element, n is 4, when D is a Group 13 element, n is 3, and in n $OR^1$s, independently, (i) $R^1$ is a linear or branched saturated or unsaturated hydrocarbon group having 1 to 20 carbon atoms, preferably 1 to 15, more preferably 1 to 10, and further preferably 1 to 5 carbon atoms, (ii) $R^1$ is an acyl group represented by formula (1a): $COR^2$ (in formula (1a), $R^2$ is a linear or branched saturated or unsaturated hydrocarbon group having 1 to 20 carbon atoms, preferably 1 to 15, more preferably 1 to 10, and further preferably 1 to 5 carbon atoms), or (iii) $R^1$ is a group represented by formula (1b): $R^3C(O)R^4$ (in formula (1b), $R^3$ is a linear or branched saturated or unsaturated hydrocarbon group having 1 to 4 carbon atoms, preferably 1 to 3, and more preferably 2 carbon atoms, and $R^4$ is $R^5$ or $OR^5$, where $R^5$ is a linear or branched saturated or unsaturated hydrocarbon group having 1 to 20 carbon atoms, preferably 1 to 15, more preferably 1 to 10, and further preferably 1 to 5 carbon atoms); and $OR^1$ is coordinate-bonded to D through a carbonyl group in the formula (1b) to form the following cyclic structure (1c):

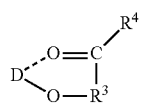

(1c)

(in formula (1c), the dotted line indicates a coordinate bond).

(2)

In formula (2), D, n, and $R^1$ are the same as those defined in formula (1), and $R^6$ is a linear or branched saturated or unsaturated hydrocarbon group having 1 to 20 carbon atoms, preferably 1 to 15, more preferably 1 to 10, and further preferably 1 to 5 carbon atoms.

Preferably, the cyclic structure (1c) is represented by the following cyclic structure (1d):

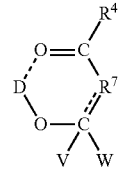

(1d)

In the formula, $R^7$ is a single bond or a linear or branched saturated or unsaturated C1-3 hydrocarbon group that is optionally substituted with one or more $R^e$s, where $R^8$ is a linear or branched saturated or unsaturated hydrocarbon group having 1 to 20 carbon atoms, preferably 1 to 15, more preferably 1 to 10, and further preferably 1 to 5 carbon atoms, V is $R^9$ or $OR^9$, where $R^9$ is a hydrogen atom or a linear or branched saturated or unsaturated hydrocarbon group having 1 to 20 carbon atoms, preferably 1 to 15, more preferably 1 to 10, and further preferably 1 to 5 carbon atoms, and

 means a single bond or a double bond, where when  means a single bond, W is $R^9$ or $OR^9$, and when  means a double bond, W is not present.

Examples of the Group 4 or Group 13 element-containing compound (B) include titanium alkoxide compounds, such as titanium tetraisopropoxide (Ti—(O-i-$C_3H_7$)$_4$), titanium tetra-n-butoxide (Ti—(O-n-$C_4H_9$)$_4$), and tetra-t-butyl titanate (Ti—(O-i-$C_4H_9$)$_4$); titanium chelate compounds, such as titanium diisopropoxy bis(acetylacetonate) (Ti—(O-i-$C_3H_7$)$_2$($C_5H_7O_2$)$_2$); titanium acylate compounds, such as titanium isostearate ((i-$C_3H_7$O)Ti(OCOC$_{17}H_{35}$)); zirconium acylate compounds, such as zirconium octylate; aluminum chelate compounds, such as aluminum bisethylacetoacetate mono-acetylacetonate (Al($C_5H_7O_2$)($C_6H_9O_3$)$_2$); and borate compounds, such as trimethyl borate (B(OCH$_3$)$_3$), triethyl borate (B(OC$_2H_5$)$_3$) and tributyl borate (B(OC$_4H_9$)$_3$).

The Group 4 or Group 13 element-containing compound (B) may be a commercial product. Examples of the commercial product include titanium tetraisopropoxide (Orgatix TA-8, manufactured by Matsumoto Fine Chemical Co., Ltd.), titanium tetra-n-butoxide (Orgatix TA-21, manufactured by Matsumoto Fine Chemical Co., Ltd.), tetra-t-butyl titanate (Orgatix TA-80, manufactured by Matsumoto Fine Chemical Co., Ltd.), titanium diisopropoxy bis(acetylacetonate) (Orgatix TC-100, manufactured by Matsumoto Fine Chemical Co., Ltd.), titanium isostearate (Orgatix TC-800, manufactured by Matsumoto Fine Chemical Co., Ltd.), zirconium octylate compound (Orgatix ZC-200, manufactured by Matsumoto Fine Chemical Co., Ltd.), aluminum bisethylacetoacetate monoacetylacetonate (Orgatix AL-3200, manufactured by Matsumoto Fine Chemical Co., Ltd.), triethyl borate (manufactured by Tokyo Chemical Industry Co., Ltd.), trimethyl borate (TMB, TMB-R, manufactured by Daihachi Chemical Industry Co., Ltd.), and tributyl borate (TBB, manufactured by Daihachi Chemical Industry Co., Ltd.).

When the amount of the coated particle is defined as 100 mass %, the amount of the Group 4 or Group 13 element-containing compound (B) contained in the coated particle is preferably 0.1 to 40 mass %, more preferably 0.3 to 30 mass %, and further preferably 0.5 to 20 mass % from the viewpoint of the storage stability and the heat stability of the epoxy resin composition including the coated particle. When the amount of the urea compound-containing epoxy resin curing agent particle (A) is defined as 100 mass %, the amount of the Group 4 or Group 13 element-containing compound (B) contained in the coated particle is preferably 0.1 to 40 mass %, more preferably 0.2 to 30 mass %, and further preferably 0.4 to 25 mass % from the viewpoint of the storage stability and the heat stability of the epoxy resin composition including the coated particle.

The Group 4 or Group 13 element-containing compound (B) may be used in the form of a mixture with alcohol, a solvent, water, or a degradation product or polymer of a compound.

<Optional Component>

The coated particle of the present invention may arbitrarily include alcohol, a solvent, water, or a degradation product or polymer of a compound that is used for coating.

<Coated Particle>

The coated particle of the present invention includes a core made of the urea compound-containing epoxy resin curing agent particle (A) and a coating made of the Group 4 or Group 13 element-containing compound (B).

The average particle diameter D of the coated particle of the present invention is not particularly limited, and is preferably 1 µm≤D≤200 µm, more preferably 1.5 µm≤D≤100 µm, further preferably 2 µm≤D≤50 µm, and even further preferably 5 µm≤D≤30 µm. When the coated particle has an average particle diameter of 1 µm or more, the epoxy resin composition can be prevented from increasing in viscosity and can maintain an appropriate viscosity. In addition, when the coated particle has an average particle diameter of 200 µm or less, the epoxy resin composition containing the coated particle of the present invention can be evenly applied without causing streaks, and the epoxy resin composition can bond or permeate narrower gaps.

<Method for Manufacturing Coated Particle>

The method for manufacturing the coated particle of the present invention is not particularly limited. For example, the coated particle can be manufactured by mixing the urea compound-containing epoxy resin curing agent particle (A) and the Group 4 or Group 13 element-containing compound (B) with a high-speed mixer, such as a Henschel mixer or a super mixer, a rotary oscillating mixer, such as a rocking mixer, or a mixing device, such as biaxial or multiaxial screw feeder or a paddle mixer. The coated particle may be manufactured without heating or with heating. The coated particle may be manufactured in a batch process or a serial process and may be treated while feeding in nitrogen depending on the process. The order of feeding of the urea compound-containing epoxy resin curing agent particle (A) and the Group 4 or Group 13 element-containing compound (B) into a mixing device is not particularly limited. For example, the Group 4 or Group 13 element-containing compound (B) may be fed into a mixing device in advance, or mixing may be performed while spraying the Group 4 or Group 13 element-containing compound (B) to the urea compound-containing epoxy resin curing agent particle (A) in a mixing device. The Group 4 or Group 13 element-containing compound (B) may be fed in in a diluted state with, for example, a solvent or water or may be fed in several times. For example, a coated particle may be manufactured by premixing the urea compound-containing epoxy resin curing agent particle (A) using a mixer for, for example, 30 seconds to 5 minutes, preferably 1 to 3 minutes, then adding the Group 4 or Group element-containing compound (B) thereto over, for example, 1 to 5 minutes, preferably 2 to 10 minutes, and then mixing them, for example, at 10° C. to 150° C., preferably 20° C. to 100° C., and more preferably 25° C. to 80° C., for 1 to 120 minutes, preferably 2 to 60 minutes.

<Method for Coating Epoxy Resin Curing Agent Particle>

The present invention also relates to a method for coating an epoxy resin curing agent particle, the method including a step of coating the surface of a urea compound-containing epoxy resin curing agent particle (A) with at least one selected from the group consisting of Group 4 or Group 13 element-containing alkoxide, chelate, and acylate compounds (B). The coating of an epoxy resin curing agent particle can be performed by mixing the urea compound-containing epoxy resin curing agent particle (A) and a Group 4 or Group 13 element-containing compound (B). Alternatively, the surface of an epoxy resin curing agent particle can be coated with a Group 4 or Group 13 element-containing compound (B) by adding the Group 4 or Group 13 element-containing compound (B) to an epoxy resin in advance and adding a urea compound-containing epoxy resin curing agent particle (A) to the mixture of the Group 4 or Group 13 element-containing compound (B) and the epoxy resin.

Furthermore, the present invention relates to an epoxy resin composition containing the coated particle and an epoxy resin.

<Epoxy Resin Composition>

The epoxy resin composition is a composition including the coated particle of the present invention and an epoxy resin.

The epoxy equivalent of the epoxy resin contained in the epoxy resin composition is, for example, preferably 50 to 2000, more preferably 100 to 1500, and more preferably 150 to 900. An epoxy resin having an epoxy equivalent of 50 or more is preferable because the epoxy resin has low volatility and the viscosity is not decreased, so as to be maintained at a level for easy handling. In addition, an epoxy resin having an epoxy equivalent of 2000 or less is preferable in handling such as the mixing of raw materials. Here, the epoxy equivalent is the mass of an epoxy resin containing one equivalent of an epoxy group and can be measured in accordance with JIS K 7236 (2009).

The epoxy resin is preferably, for example, a bisphenol A type epoxy resin, a bisphenol F type epoxy resin, a bisphenol E type epoxy resin, a bisphenol S type epoxy resin, a bisphenol AF type epoxy resin, a bisphenol AP type epoxy resin, a bisphenol AD type epoxy resin, a bisphenol B type epoxy resin, a bisphenol BP type epoxy resin, a bisphenol C type epoxy resin, a bisphenol G type epoxy resin, a bisphenol M type epoxy resin, a bisphenol P type epoxy resin, a trisphenol type epoxy resin, a biphenyl type epoxy resin, a polyalkylene glycol type epoxy resin, an alkylene glycol type epoxy resin, a naphthol type epoxy resin, a naphthalene type epoxy resin, a fluorene type epoxy resin, a tetraphenylolethane type epoxy resin, a glycidyl ether type epoxy resin, a glycidyl ester type epoxy resin, a phenol novolac type epoxy resin, a cresol novolac type epoxy resin, a bisphenol A novolac type epoxy resin, a naphthol novolac type epoxy resin, a trishydroxyphenylmethane type epoxy resin, an anthracene type epoxy resin, an epoxy resin having a butadiene structure, a biphenylaralkyl type epoxy resin, a phenolaralkyl type epoxy resin, a glycidylamine type epoxy resin such as an aromatic glycidylamine type epoxy resin, a phosphorus-containing epoxy resin, an alicyclic epoxy resin, an aliphatic epoxy resin, an epoxy resin having a dicyclopentadiene structure, a diglycidyl etherified product of bisphenol, a diglycidyl etherified product of naphthalenediol, a glycidyl etherified product of phenol, and a diglycidyl etherified product of alcohol; or an alkyl substitution product, halide, or hydrogenated product of these resins, more preferably a bisphenol A type epoxy resin or a bisphenol F type epoxy resin, and more preferably a bisphenol A type epoxy resin.

Specifically, examples of such resins include bisphenol A type epoxy resins ("JER828EL", "JER827", and "JER1001", manufactured by Mitsubishi Chemical Corporation), bisphenol F type epoxy resins ("JER807", manufactured by Mitsubishi Chemical Corporation), bisphenol AF type epoxy resins ("ZX1059", manufactured by Tohto Kasei Co., Ltd.), naphthalene type epoxy resins ("HP-4700" and "HP-5000", manufactured by DIC Corporation), phenol novolac type epoxy resins ("N-770", manufactured by DIC Corporation), glycidylamine type epoxy resins ("JER630", manufactured by Mitsubishi Chemical Corporation), cresol novolac type epoxy resins ("N-695", manufactured by DIC Corporation), alicyclic epoxy resins ("CEL2021P", manufactured by Daicel Corporation), hydrogenated epoxy resins ("YX8000", manufactured by Mitsubishi Chemical Corporation), dicyclopentadiene type multifunctional epoxy resins ("HP7200, manufactured by DIC Corporation), epoxy resins having butadiene structures ("PB-3600", manufactured by Daicel Corporation), epoxy resins having biphenyl structures ("NC3000H" and "NC3000L", manufactured by Nippon Kayaku Co., Ltd.; and "YX4000", manufactured by Mitsubishi Chemical Corporation), and aliphatic epoxy resins ("EX-216L, manufactured by Nagase ChemteX Corporation).

The epoxy resin may be modified. Preferable examples of the modified epoxy resin include urethane-modified epoxy resins, rubber-modified epoxy resins, dimer acid-modified epoxy resins, and Thiokol-modified epoxy resins.

The urethane-modified epoxy resin may have any structure as long as it is a resin having a urethane bond and two or more epoxy groups in the molecule. For example, a resin that is obtained by reacting a compound having a urethane bond, the urethane bond being obtained by an addition reaction of a polyhydroxy compound having a hydroxyl group (e.g., polyether polyol, polyester polyol, polybutadiene polyol, polyolefin polyol, or an addition product of hydroxycarboxylic acid and alkylene oxide) and a polyisocyanate compound having an isocyanate group (e.g., tolylene diisocyanate, diphenylmethane diisocyanate, or naphthalene diisocyanate), with a bisphenol type epoxy resin (epoxy compound having a hydroxy group) is used. Specifically, the urethane-modified epoxy resin can be appropriately selected and used from, for example, Epoxy series (803, 802-30CX, 820-40CX, 834, etc.) manufactured by Mitsui Chemicals, Inc. and Adeka Resin EPU series manufactured by Adeka Corporation.

The rubber-modified epoxy resin may be any epoxy resin having two or more epoxy groups in the molecule and a skeleton of rubber. Examples of the rubber forming the skeleton include polybutadiene, acrylonitrile butadiene rubber (NBR), butadiene-acrylonitrile rubber having carboxyl groups on both terminals (carboxyl-terminated butadiene-nitrile rubber: CTBN), butadiene-acrylonitrile rubber having amino groups on both terminals (amino-terminated butadiene-nitrile rubber: ATBN), and butadiene-acrylonitrile rubber having a carboxyl group and an amino group on both terminals (carboxyl-terminated and amino-terminated butadiene-nitrile rubber). Specifically, the rubber-modified epoxy resin can be appropriately selected and used from, for example, the EPR series manufactured by Adeka Corporation. The rubber-modified epoxy resin may be manufactured by any method and can be manufactured by, for example, reacting rubber and epoxy in a large amount of the epoxy. The epoxy (for example, an epoxy resin) that is used for manufacturing a rubber-modified epoxy resin is not particularly limited, and examples thereof include known epoxy compounds.

The epoxy resin may arbitrarily include a core-shell polymer particle. The term "core-shell polymer particle" refers to a particle obtained by coating a part or the whole of the surface of a rubber-like and particle-like core component with a shell component. When the epoxy resin includes core-shell polymer particles, the resulting cured product can have improved strength and toughness.

The core component is a rubber-like particle whose main component is a crosslinked rubbery polymer or a crosslinked elastomer. Examples of the core component include polymers obtained by polymerization of a monomer selected from vinyl monomers, conjugated diene monomers, (meth) acrylic acid ester monomers, and mixtures thereof; and silicone resins. More preferably, examples of the core component include polymers obtained from aromatic vinyl monomers, polymers obtained from conjugated diene monomers, and styrene/butadiene-based crosslinked rubbery polymers.

The shell component is a component coating a part or the whole of the surface of the core component. The shell component may chemically bond to the core component or may be a polymer obtained by graft polymerization of a monomer as a precursor of the shell component on the surface of the core component. Examples of the shell component include polymers obtained by polymerization of one or more monomers selected from, for example, aromatic vinyl monomers and (meth)acrylic acid ester monomers. When a styrene/butadiene-based crosslinked rubbery polymer is used as the core component, a mixture of methyl (meth)acrylate and styrene may be used as a monomer.

In addition, in order to stabilize the dispersion state of core-shell polymer particles in the epoxy resin, it is preferable that a functional group that reacts with an epoxy resin is introduced into the shell component. Examples of the functional group include a hydroxyl group, a carboxyl group, and an epoxy group, and an epoxy group is particularly preferred. Examples of the method for introducing an epoxy group include a method using the shell component in combination with, for example, 2,3-epoxypropyl methacrylate and graft-polymerizing it with a core component.

The average particle diameter of the core-shell polymer particles is, for example, 1 to 500 nm and preferably 3 to 300 nm. Incidentally, the average particle diameter mentioned here is a volume average particle diameter and can be measured using a Nanotrac particle size analyzer (manufactured by Nikkiso Co., Ltd.).

The core-shell polymer particles can be manufactured by a known method, such as the method described in Japanese Unexamined Patent Application Publication No. 2004-315572. Specifically, for example, a monomer for obtaining core-shell polymer particles is polymerized in an aqueous medium by a method, such as emulsion polymerization, dispersion polymerization, or suspension polymerization, to obtain a suspension in which the core-shell polymer particles are dispersed. An organic solvent is mixed with the resulting suspension, the mixture is then brought into contact with a water-soluble electrolyte for phase separation into an organic solvent layer and an aqueous layer, and the aqueous layer is removed to obtain a core-shell polymer particle-dispersing organic solvent. An epoxy resin is appropriately mixed with the resulting core-shell polymer-dispersing organic solvent, and the organic solvent is evaporated and removed to obtain the target core-shell polymer particles. Here, examples of the organic solvent include ether solvents, such as acetone and methyl ethyl ketone. In addition, examples of the water-soluble electrolyte include organic solvents that are partially soluble in water, such as sodium chloride and potassium chloride. As the epoxy resin, the above-mentioned epoxy resins can be used. The epoxy resin dispersing core-shell rubber may be a commercial product. For example, Kane Ace MX series manufactured by Kaneka Corporation, such as MX-120 (styrene/butadiene rubber: 25%, bisphenol A type liquid epoxy resin, average particle diameter: 100 nm), MX-125 (styrene/butadiene rubber: 25%, bisphenol A type liquid epoxy resin, average particle diameter: 100 nm), MX-130 (styrene/butadiene rubber: 25%, bisphenol F type liquid epoxy resin, average particle diameter: 100 nm), MX-153 (polybutadiene rubber: 333%, bisphenol A type liquid epoxy resin, average particle diameter: 100 nm), and MX-154 (polybutadiene rubber: 40%, bisphenol A type liquid epoxy resin, average particle diameter: 100-200 nm); and RKB3040 (butadiene rubber: 29%, average particle diameter: 100-200 nm) manufactured by Resinous Co., Ltd. can also be preferably used.

Epoxy resins may be used alone or in combination of two or more thereof. The epoxy resin may be a liquid or a solid or may also be a mixture of a liquid resin and a solid resin. Here, the terms "liquid" and "solid" refer to the forms of an epoxy resin at an ordinary temperature (25° C.). From the viewpoint of coatability, processability, and adhesiveness, it is preferable that the epoxy resin to be used include at least 10 mass % or more of a liquid epoxy resin.

The liquid epoxy resin is preferably a bisphenol A type epoxy resin, a bisphenol F type epoxy resin, a bisphenol AF type epoxy resin, a naphthalene type epoxy resin, a glycidyl ester type epoxy resin, a phenol novolac type epoxy resin, an alicyclic epoxy resin having an ester skeleton, or an epoxy resin having a butadiene structure. Specifically, examples of the liquid epoxy resin include "HP4032", "HP4032D", and "HP4032SS" (naphthalene type epoxy resin) manufactured by DIC Corporation; "828US" and "jER828EL" (bisphenol A type epoxy resin), "jER807" (bisphenol F type epoxy resin), "jER152" (phenol novolac type epoxy resin), and "YL7760" (bisphenol AF type epoxy resin) manufactured by Mitsubishi Chemical Corporation; "ZX1059" (mixture of a bisphenol A type epoxy resin and a bisphenol F type epoxy resin) manufactured by NIPPON STEEL Chemical & Material Co., Ltd.; "EX-721" (glycidyl ester type epoxy resin) manufactured by Nagase ChemteX Corporation; and "Celloxide 2021P" (alicyclic epoxy resin having an ester skeleton) and "PB-3600" (epoxy resin having a butadiene structure) manufactured by Daicel Corporation.

The solid epoxy resin is preferably a naphthalene type tetrafunctional epoxy resin, a cresol novolac type epoxy resin, a dicyclopentadiene type epoxy resin, a trisphenol type epoxy resin, a naphthol type epoxy resin, a biphenyl type epoxy resin, a naphthylene ether type epoxy resin, an anthracene type epoxy resin, a bisphenol A type epoxy resin, or a tetraphenylethane type epoxy resin. Specifically, examples of the solid epoxy resin include "HP4032H" (naphthalene type epoxy resin), "HP-4700" and "HP-4710" (naphthalene type tetrafunctional epoxy resin), "N-690" (cresol novolac type epoxy resin), "N-695" (cresol novolac type epoxy resin), "HP-7200" (dicyclopentadiene type epoxy resin), and "HP-7200HH", "EXA7311", "EXA7311-G3", "EXA7311-G4", "EXA7311-G4S", and "HP6000" (naphthylene ether type epoxy resin) manufactured by DIC Corporation; "EPPN-502H" (trisphenol type epoxy resin), "NC7000L" (naphthol novolac type epoxy resin), and "NC3000H", "NC3000", "NC3000L", and "NC3100" (biphenyl type epoxy resin) manufactured by Nippon Kayaku Co., Ltd.; "ESN475V" (naphthol type epoxy resin) and "ESN485" (naphthol novolac type epoxy resin) manufactured by NIPPON STEEL Chemical & Material Co., Ltd.; "YX4000H" and "YL6121" (biphenyl type epoxy resin), "YX4000HK" (bixylenol type epoxy resin), and "YX8800" (anthracene type epoxy resin) manufactured by Mitsubishi Chemical Corporation; "PG-100" and "CG-500" manufactured by Osaka Gas Chemicals Co., Ltd.; "YL7800" (fluorene type epoxy resin) manufactured by Mitsubishi Chemical Corporation; and "jER1010" (solid bisphenol A type epoxy resin) and "jER1031S" (tetraphenylethane type epoxy resin) manufactured by Mitsubishi Chemical Corporation.

The epoxy resin composition includes the coated particle of the present invention in an amount of preferably 0.1 to 50 mass %, more preferably 0.3 to 40 mass %, and further preferably 0.5 to 30 mass %. When the content of the coated particle is 0.1 mass % or more, the curing becomes faster, and the thermosetting time can be shortened. When the content is 50 mass % or less, the resin composition has sufficient storage stability and heat stability.

The epoxy resin composition of the present invention can further include one of more selected from the group consisting of a curing agent, a curing accelerator, a thermosetting resin, a thermoplastic resin, an inorganic filling material, an organic filling material, a thickener, anti-foaming agent, a leveling agent, an adhesion-imparting agent, a coloring agent, an organic solvent, and water.

The curing agent means an epoxy resin curing agent other than the coated particle of the present invention, and examples thereof include a thiol compound, an acid anhydride compound, a guanidine compound, a hydrazide compound, a phenol compound, a naphthol compound, an active ester compound, a benzoxazine compound, a cyanate ester compound, and a carbodiimide compound.

Examples of the thiol compound include thiol compounds obtained by esterification of a polyol and a mercapto organic acid, such as trimethylolpropane tris(thioglycolate), pentaerythritol tetrakis(thioglycolate), ethylene glycol dithioglycolate, trimethylolpropanetris(3-mercaptopropionate), trimethylolpropane tris(β-thiopropionate), pentaerythritol tetrakis(β-thiopropionate), and dipentaerythritol poly(β-thiopropionate); alkyl polythiol compounds, such as 1,4-butanedithiol, 1,6-hexanedithiol, and 1,10-decanedithiol; terminal thiol group-containing polyethers; terminal thiol group-containing polythioethers; thiol compounds obtained by a reaction of an epoxy compound and hydrogen sulfide;

and thiol compounds having a terminal thiol group obtained by a reaction of a polythiol compound and an epoxy compound.

Examples of the acid anhydride compound include tetrahydrophthalic anhydride, hexahydrophthalic anhydride, methyltetrahydrophthalic anhydride, methyl hexahydrophthalic anhydride, methyl nadic anhydride, methyl bicyclo[2.2.1]heptane-2,3-dicarboxylic acid anhydride, tetrapropenyl succinic anhydride (3-dodecenyl succinic anhydride), octenyl succinic acid anhydride, ethylene glycol bisanhydrotrimellitate, methyl endo methylene tetrahydrophthalic anhydride, and 3,4-dimethyl-6-(2-methyl-1-propenyl)-4-cyclohexene-1,2-dicarboxylic acid anhydride; and mixtures of these compounds with 1-isopropyl-4-methylbicyclo[2.2.2]oct-5-ene-2,3-dicarboxylic acid anhydride. Examples of commercially available acid anhydride include HN-2200 (methyl tetrahydrophthalic anhydride) and HN-5500 (methyl tetrahydrophthalic anhydride) manufactured by Hitachi Chemical Company, Ltd.

Examples of the guanidine compound include dicyandiamide, 1-methylguanidine, 1-ethylguanidine, 1-cyclohexylguanidine, 1-phenylguanidine, 1-(o-tolyl)guanidine, dimethylguanidine, diphenylguanidine, trimethylguanidine, tetramethylguanidine, pentamethylguanidine, 1,5,7-triazabicyclo[4.4.0]dec-5-ene, 7-methyl-1,5,7-triazabicyclo[4.4.0]dec-5-ene, 1-methylbiguanide, 1-ethylbiguanide, 1-n-butylbiguanide, 1-n-octadecylbiguanide, 1,1-dimethylbiguanide, 1,1-diethylbiguanide, 1-cyclohexylbiguanide, 1-allylbiguanide, 1-phenylbiguanide, and 1-(o-tolyl)biguanide. Preferable examples of the guanidine compound include dicyandiamide and 1-(o-tolyl)biguanide, and dicyandiamide is particularly preferred. Examples of commercially available guanidine compound include "jER Cure DICY-7" (dicyandiamide) manufactured by Japan Epoxy Resin Co. (Mitsubishi Chemical Corporation) and "Nocceler BG" (1-(o-tolyl)biguanide) manufactured by Ouchi Shinko Chemical Industrial Co., Ltd.

Examples of the hydrazide compound include carbohydrazide, oxalic acid dihydrazide, malonic acid dihydrazide, succinic acid dihydrazide, iminodiacetic acid dihydrazide, adipic acid dihydrazide, pimelic acid dihydrazide, suberic acid dihydrazide, azelaic acid dihydrazide, sebacic acid dihydrazide, dodecanediohydrazide, hexadecande dihydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, 2,6-naphthoic acid dihydrazide, 4,4'-bisbenzene dihydrazide, 1,4-naphthoic acid dihydrazide, naphthalene-2,6-dicarbohydrazide, 3-hydroxy-2-naphthoic acid hydrazide, and citric acid trihydrazide. Examples of commercially available hydrazide compound include Amicure VDH and Amicure UDH manufactured by Ajinomoto Fine-Techno Co., Ltd.

Specifically, examples of the phenol compound and the naphthol compound include "MEH-7700", "MEH-7810", and "MEH-7851" manufactured by Meiwa Plastic Industries, Ltd.; "NHN", "CBN", and "GPH" manufactured by Nippon Kayaku Co., Ltd.; "SN170", "SN180", "SN190", "SN475", "SN485", "SN495", "SN375", and "SN395" manufactured by Nippon Steel Corporation; and "LA7052", "LA7054", "LA3018", "EXB-9500", and "TD2090" manufactured by DIC Corporation.

The active ester compound is not particularly limited. In general, a compound having two or more highly reactive ester groups in one molecule, such as phenol ester, a thiophenol ester, an N-hydroxyamine ester, or an ester of a heterocyclic hydroxy compound, is preferably used. The active ester compound is preferably a compound obtained by means of a condensation reaction of a carboxylic acid compound and/or a thiocarboxylic acid compound and a hydroxy compound and/or a thiol compound. Specifically, preferred are an active ester compound having a dicyclopentadiene type diphenol structure, an active ester compound having a naphthalene structure, an active ester compound containing an acetylated product of phenol novolac, and an active ester compound containing a benzoylated product of phenol novolac. The term "dicyclopentadiene type diphenol structure" refers to a divalent structural unit composed of phenylene-dicyclopentylene-phenylene. Examples of commercially available active ester compound include, as the active ester compound having a dicyclopentadiene type diphenol structure, "EXB9451", "EXB9460", "EXB9460S", and "HPC-8000-65T" (manufactured by DIC Corporation); as the active ester compound having a naphthalene structure, "EXB9416-70BK" (manufactured by DIC Corporation); as the active ester compound containing an acetylated product of phenol novolac, "DC808" (manufactured by Mitsubishi Chemical Corporation); and as the active ester compound containing a benzoylated product of phenol novolac, "YLH1026" (manufactured by Mitsubishi Chemical Corporation).

Specifically, examples of the benzoxazine compound include "HFB2006M" manufactured by Showa Denko K.K. and "P-d" and "F-a" manufactured by Shikoku Chemicals Corporation.

Examples of the cyanate ester compound include bifunctional cyanate resins, such as bisphenol A dicyanate, polyphenol cyanate, oligo(3-methylene-1,5-phenylene cyanate), 4,4'-methylenebis(2,6-dimethylphenyl cyanate), 4,4'-ethylidenediphenyl dicyanate, hexafluorobisphenol A dicyanate, 2,2-bis(4-cyanate)phenylpropane, 1,1-bis(4-cyanatephenyl-methane), bis(4-cyanate-3,5-dimethylphenyl)methane, 1,3-bis(4-cyanatephenyl-1-(methylethylidene))benzene, bis(4-cyanatephenyl)thioether, and bis(4-cyanatephenyl)ether; multifunctional cyanate resins induced from, for example, phenol novolac and cresol novolac; and prepolymers that are partially triazinized products of these cyanate resins. Specifically, examples of the cyanate ester-based curing agent include "PT30" and "PT60" (both are phenol novolac type multifunctional cyanate ester resins) and "BA230" (prepolymer that is a partially or wholly triazinized bisphenol A dicyanate into a trimer) manufactured by Lonza Japan Ltd.

Specifically, examples of the carbodiimide compound include "V-03" and "V-07" manufacture by Nisshinbo Chemical Inc.

Examples of the curing accelerator include phosphorus-based curing accelerators, amine-based curing accelerators, imidazole-based curing accelerators, and guanidine-based curing accelerators. The curing accelerators may be used alone or in combination of two or more thereof.

Examples of the phosphorus-based curing accelerator include triphenylphosphine, phosphonium borate compounds, tetraphenylphosphonium tetraphenyl borate, n-butylphosphonium tetraphenyl borate, tetrabutylphosphonium decanoate, (4-methylphenyl)triphenylphosphonium thiocyanate, tetraphenylphosphonium thiocyanate, and butyltriphenylphosphonium thiocyanate, and triphenylphosphine and tetrabutylphosphonium decanoate are preferred.

Examples of the amine-based curing accelerator include trialkylamines, such as triethylamine and tributylamine; and 4-dimethylaminopyridine, benzyldimethylamine, 2,4,6,-tris(dimethylaminomethyl)phenol, and 1,8-diazabicyclo(5,4,0)-undecene, and 4-dimethylaminopyridine and 1,8-diazabicyclo(5,4,0)-undecene are preferred.

Examples of the imidazole-based curing accelerator include imidazole compounds, such as 2-methylimidazole, 2-undecylimidazole, 2-heptadecylimidazole, 1,2-dimethylimidazole, 2-ethyl-4-methylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, and 2-phenylimidazoline; and adducts of imidazole compounds and epoxy resins, and 2-ethyl-4-methylimidazole and 1-benzyl-2-phenylimidazole are preferred.

The imidazole-based curing accelerator may be a commercial product, and examples thereof include "P200-H50" manufactured by Mitsubishi Chemical Corporation.

As the guanidine-based curing accelerator, the same compounds as the guanidine compounds as the curing agent can be used, and examples thereof include dicyandiamide, 1-methylguanidine, 1-ethylguanidine, 1-cyclohexylguanidine, 1-phenylguanidine, 1-(o-tolyl)guanidine, dimethylguanidine, diphenylguanidine, trimethylguanidine, tetramethylguanidine, pentamethylguanidine, 1,5,7-triazabicyclo[4.4.0]dec-5-ene, 7-methyl-1,5,7-triazabicyclo[4.4.0]dec-5-ene, 1-methylbiguanide, 1-ethylbiguanide, 1-n-butylbiguanide, 1-n-octadecylbiguanide, 1,1-dimethylbiguanide, 1,1-diethylbiguanide, 1-cyclohexylbiguanide, 1-allylbiguanide, 1-phenylbiguanide, and 1-(o-tolyl)biguanide, and dicyandiamide and 1,5,7-triazabicyclo[4.4.0]dec-5-ene are preferred.

The content of the curing accelerator in the resin composition is not particularly limited and is preferably within a range of 0.05 to 3 mass %.

"Thermosetting resin" means a thermosetting resin other than the above-mentioned epoxy resins, and examples thereof include vinylbenzyl compounds, acrylic compounds, maleimide compounds, and blocked isocyanate compounds.

Examples of the thermoplastic resin include phenoxy resins, polyvinyl acetal resin, polyolefin resins, polybutadiene resins, polyimide resins, polyamideimide resins, polyetherimide resins, polysulfone resins, polyether sulfone resins, polyphenylene ether resins, polycarbonate resins, polyether ketone resins, and polyester resins, and phenoxy resins are preferred. The thermoplastic resins may be used alone or in combination of two or more thereof.

The thermoplastic resin preferably has a weight average molecular weight within a range of 8,000 to 70,000, more preferably 10,000 to 60,000, and further preferably 20,000 to 60,000, in terms of polystyrene. The weight average molecular weight in terms of polystyrene of the thermoplastic resin is measured by a gel permeation chromatography (GPC) method. Specifically, the weight average molecular weight in terms of polystyrene of the thermoplastic resin can be measured using a measurement apparatus, such as LC-9A/RID-6A, manufactured by Shimadzu Corporation, columns, such as Shodex K-800P/K-804L/K-804L, manufactured by Showa Denko K.K., and a mobile phase of, for example, chloroform at a column temperature of 40° C. and can be calculated using a calibration curve of standard polystyrene.

Examples of the phenoxy resin include phenoxy resins having one or more skeletons selected from the group consisting of a bisphenol A skeleton, a bisphenol F skeleton, a bisphenol S skeleton, a bisphenol acetophenone skeleton, a novolac skeleton, a biphenyl skeleton, a fluorene skeleton, a dicyclopentadienyl skeleton, a norbornene skeleton, a naphthalene skeleton, an anthracene skeleton, an adamantane skeleton, a terpene skeleton, and a trimethylcyclohexane skeleton. The terminal of the phenoxy resin may be any functional group, such as a phenolic hydroxyl group and an epoxy group. The phenoxy resins may be used alone or in combination of two or more thereof. Specifically, examples of the phenoxy resin include "1256" and "4250" (both are bisphenol A skeleton-containing phenoxy resins), "YX8100" (bisphenol S skeleton-containing phenoxy resin), and "YX6954" (bisphenol acetophenone skeleton-containing phenoxy resin) manufactured by Mitsubishi Chemical Corporation and also include "FX280" and "FX293" manufactured by NIPPON STEEL Chemical & Material Co., Ltd. and "YL6954BH30", "YX7553", "YL7769BH30", "YL6794", "YL7213", "YL7290", and "YL7482" manufactured by Mitsubishi Chemical Corporation.

Examples of the polyvinyl acetal resin include polyvinyl formal resins and polyvinyl butyral resins, and polyvinyl butyral resins are preferred. Specifically, examples of the polyvinyl acetal resin include "Denka Butyral 4000-2", "Denka Butyral 5000-A", "Denka Butyral 6000-C", and "Denka Butyral 6000-EP" manufactured by Denka Company Limited; and S-LEC BH series, BX series, KS series, BL series, and BM series manufactured by Sekisui Chemical Company, Limited.

Specifically, examples of the polyimide resin include "Rikacoat SN20" and "Rikacoat PN20" manufactured by New Japan Chemical Co., Ltd.

Specifically, examples of the polyamideimide resin include "Vylomax HR11NN" and "Vylomax HR16NN" manufactured by Toyobo Co., Ltd. and also include modified polyamideimide, such as "K59100" and "K59300" (polysiloxane skeleton-containing polyamideimide) manufactured by Hitachi Chemical Company, Ltd.

Specifically, examples of the polyether sulfone resin include "PES5003P" manufactured by Sumitomo Chemical Co., Ltd.

Specifically, examples of the polysulfone resin include Polysulfone "P1700" and "P3500" manufactured by Solvay Advanced Polymers LLC.

The content of the thermoplastic resin in the resin composition is preferably 0.1 to 20 mass %, more preferably 0.5 to 10 mass %, and further preferably 1 to 5 mass %.

The material of the inorganic filling material is not particularly limited, and examples thereof include silica, alumina, glass, cordierite, silicon oxide, barium sulfate, barium carbonate, talc, clay, mica powder, zinc oxide, hydrotalcite, boehmite, aluminum hydroxide, magnesium hydroxide, calcium carbonate, magnesium carbonate, magnesium oxide, boron nitride, aluminum nitride, manganese nitride, aluminum borate, strontium carbonate, strontium titanate, calcium titanate, magnesium titanate, bismuth titanate, titanium oxide, zirconium oxide, barium titanate, barium zirconate titanate, barium zirconate, calcium zirconate, zirconium phosphate, and zirconium phosphate tungstate; and iron, iron oxide, ferrite, alloys, and other electrically conductive fillers, magnetic fillers, and thermally conductive fillers. As an aspect of the present invention, an epoxy resin composition containing at least one selected from the group consisting of silica, electrically conductive fillers, magnetic fillers, and thermally conductive fillers is preferred.

Examples of the silica include amorphous silica, fused silica, crystalline silica, synthetic silica, and hollow silica. In addition, the silica is preferably spherical silica. The average particle diameter is not particularly limited and is preferably 600 nm or less, more preferably 300 nm or less, and further preferably 200 nm or less. The lower limit of the average particle diameter is not particularly limited and is preferably 5 nm or more. Examples of commercial products include "SO-C2", "SO-C1", and "SO-C4" manufactured by Admatechs Co., Ltd. The average particle diameter of the inorganic filling material can be measured by a laser diffraction scattering method based on Mie scattering theory.

Specifically, examples of the electrically conductive filler include metal particles, such as solder particles, nickel particles, nano-sized metal crystals, particles in which the surface of metal is coated with another metal, and gradient particles of copper and silver; and particles obtained by coating resin particles, such as styrene resin, urethane resin, melamine resin, epoxy resin, acrylic resin, phenolic resin, and styrene/butadiene resin, with an electrically conductive thin film of, for example, gold, nickel, silver, copper, or solder. The electrically conductive filler is usually spherical fine particles of about 1 to 20 μm.

Specifically, examples of the magnetic filler include pure iron powder; Fe alloys, such as Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Ni—Cr-based alloy powder, and Fe—Cr—Al-based alloy powder; amorphous alloys, such as Fe-based amorphous and Co-based amorphous alloys; spinel type ferrites, such as Mg—Zn-based ferrite, Mn—Zn-based ferrite, Mn—Mg-based ferrite, Cu—Zn-based ferrite, Mg—Mn—Sr-based ferrite, and Ni—Zn-based ferrite; hexagonal crystal ferrites, such as Ba—Zn-based ferrite, Ba—Mg-based ferrite, Ba—Ni-based ferrite, Ba—Co-based ferrite, and Ba—Ni—Co-based ferrite; and Garnet type ferrites, such as Y-based ferrite.

Specifically, examples of the thermally conductive filler include aluminum nitride, alumina, boron nitride, silicon nitride, graphite powder, and silicon carbide. Examples of commercially available aluminum nitride include "Shapal H" manufactured by Tokuyama Corporation. Examples of commercially available silicon nitride include "SN-9S" manufactured by Denka Company Limited. Examples of commercially available alumina include "AHP300" manufactured by Nippon Light Metal Company, Ltd.; "Alunabeads B" (for example, "CB-P05" and "CB-A30S") manufactured by Showa Denko K.K.; and "DAW-45", "DAW-05", and "ASFP-20" manufactured by Denka Company Limited.

Examples of the organic filling material include silicone powder, nylon powder, fluorine powder, acrylic rubber particles, polyamide fine particles, and silicone particles. Specifically, the acrylic rubber particles may be any resin fine particles that are insoluble and infusible in organic solvents due to chemical crosslinking treatment of a resin having rubber elasticity, such as acrylonitrile-butadiene rubber, butadiene rubber, and acrylic rubber. Specifically, examples of the acrylic rubber particles include XER-91 (manufactured by Japan Synthetic Rubber (JSR) Corporation), Staphyloid AC3355, AC3816, AC3832, AC4030, AC3364, and IM101 (manufactured by Aica Kogyo Co., Ltd.), and Paraloid EXL2655 and EXL2602 (manufactured by Kureha Corporation). Specifically, the polyamide fine particles may be any fine particles of a resin having an amide bond, such as an aliphatic polyamide such as nylon, an aromatic polyamide such as Kevlar, and polyamideimide, having a size of 50 μm or less. Specifically, examples of the polyamide fine particles include VESTOSINT 2070 (manufactured by Daicel-Huels Ltd.) and SP500 (manufactured by Toray Industries, Inc.).

Examples of the thickener include orben and Benton.

Examples of the anti-foaming agent include a silicone-based anti-foaming agent, a fluorine-based anti-foaming agent, and a polymer anti-foaming agent.

A commercially available surfactant can be used as the leveling agent, and examples thereof include silicone, fluorine, ester, cationic, anionic, nonionic, and amphoteric surfactants. These agents may be used alone or in combination of two or more thereof. Examples of the surfactant include polyoxyethylene alkyl ethers, polyoxyethylene alkyl phenyl ethers, polyethylene glycol diesters, sorbitan fatty acid esters, fatty acid modified polyesters, tertiary amine modified polyurethanes, and polyethyleneimines, and also include, under trade names, KP (manufactured by Shin-Etsu Chemical Co., Ltd.), Polyflow (manufactured by Kyoeisha Chemical Co., Ltd.), EFTOP (Mitsubishi Materials Electronic Chemicals Co., Ltd.), Megaface (manufactured by DIC Corporation), Fluorad (manufactured by Sumitomo 3M Japan Limited), AsahiGuard (manufactured by AGC Inc.), Surflon (manufactured by AGC Seimi Chemical Co., Ltd.), Solsperse (manufactured by AstraZeneca), EFKA (manufactured by CIBA Specialty Chemicals), and Ajisper (manufactured by Ajinomoto Fine-Techno Co., Ltd.).

Examples of the adhesion-imparting agent include imidazole type, thiazole type, triazole type, and silane coupling agents. Specifically, the examples include vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloyloxypropyltrimethoxysilane, and 3-mercaptopropyltrimethoxysilane.

Examples of the coloring agent include phthalocyanine blue, phthalocyanine green, iodine green, disazo yellow, and carbon black.

Examples of the organic solvent include ketones, such as acetone, methyl ethyl ketone (MEK), and cyclohexanone; acetates, such as ethyl acetate, butyl acetate, cellosolve acetate, propylene glycol monomethyl ether acetate, and carbitol acetate; carbitols, such as cellosolve and butyl carbitol; aromatic hydrocarbons, such as toluene and xylene; and amide solvents, such as dimethylformamide, dimethylacetamide (DMAc), and N-methylpyrrolidone. The organic solvents may be used alone or in combination of two or more thereof.

The epoxy resin composition of the present invention can be in a liquid, paste, or film form.

The epoxy resin composition can be used, for example, as an epoxy resin material in various fields such as construction, civil engineering, automobiles, ships, aerospace, industrial machines, robots, communications, electrical and electronic, semiconductors, and displays.

More specifically, the epoxy resin composition can be used as, for example, an adhesive, a binder, an electrically conductive material, a magnetic material, a thermally conductive material, an insulating material, a sealing material, a coating material, a vibration damping material, an acoustic insulating material, a filling material, or a paint.

The adhesive and the binder are useful as adhesives and sealing materials for construction and civil engineering, structural adhesives and binders for automobiles, ships, and aircrafts, adhesives for assembling industrial machines and robots, and die bonding materials for assembling electronic components and IC chips. The adhesive and the binder of the present invention can be used for housing, bodies, and chassis of automobiles, ships, and aircraft; CPUs of PCs, smartphones, and tablets; and camera modules, communication modules, and spindle motor parts for hard disks. The structural adhesive for automobiles is preferable as, for example, a weld bonding adhesive or a hemming adhesive.

The electrically conductive material preferably includes the above-mentioned electrically conductive filler and is manufactured by, for example, the method described in Japanese Unexamined Patent Application Publication No. 01-113480.

The electrically conductive material of the present invention can be used for manufacturing electronic devices, integrated circuits, semiconductor devices, passive elements, solar cells, solar modules, and/or light-emitting diodes; mounting chip components such as driver ICs and LED elements; or assembling electronic components. The electrically conductive material can also be an anisotropic conductive material having both electrical conductivity and insulation.

The magnetic material preferably includes the magnetic filler.

The magnetic material of the present invention can be used for, for example, an electromagnetic wave shield, a coil component, an inductor device, an electromagnetic wave absorber, a magnetic ink, or an antenna device.

The thermally conductive material preferably includes the above-mentioned thermally conductive filler. The thermally conductive material of the present invention can be used for, for example, a CPU or a power IC module. Examples of the method for manufacturing the thermally conductive material include methods described in Japanese Unexamined Patent Application Publication Nos. 06-136244, 10-237410, and 2000-3987. More specifically, an epoxy resin serving as a thermosetting resin, a phenol novolac curing agent or a thiol compound serving as a curing agent, and a thermally conductive filler material are mixed and uniformly kneaded. The resulting mixture is mixed with the coated particle of the present embodiment to obtain a thermally conductive material.

As the insulating material, among the above-mentioned filling materials, an insulative filling material, for example, silica is preferably used. Examples of the method for manufacturing the insulative film include the methods described in Japanese Unexamined Patent Application Publication Nos. 62-141083 and 05-295329. More specifically, a solid epoxy resin, a liquid epoxy resin, and optionally a solid urethane resin are dissolved, mixed, or dispersed in toluene in a total amount of 50 mass % with respect to all components including the solvent to prepare a solution. The coated particle of the present embodiment is added to and dispersed in the resulting solution in an amount of 30 mass % to prepare varnish. This varnish is applied to, for example, a polyethylene terephthalate base material for peeling having a thickness of 50 μm so as to have a thickness of 30 μm after evaporation of toluene. After the evaporation of toluene, the latent curing agent, which is inert at ordinary temperature, exhibits adhesiveness by being heated.

Examples of the insulating material of the present invention include an insulating adhesive sheet, an insulating adhesive film, an insulating adhesive paste, an insulating paste, an insulating film, an insulating sheet, and an insulating paint for electronic and electrical parts. The insulating material can be usefully used in applications where insulation is required and can be used for, for example, an interlayer insulation layer or solder resist layer of a printed wiring board.

Examples of the sealing material include a solid sealing material, a liquid sealing material, and a film-like sealing material. The liquid sealing material is useful as, for example, an underfill material, a potting material, a dam material, or a casting material. The sealing material of the present invention can be used for, for example, a semiconductor package of a wafer level package or a BGA (ball grid array) package. The epoxy resin composition of the present invention is also useful as a sealing material for an automobile structure. As a method for manufacturing the sealing material, for example, the methods described in, for example, Japanese Unexamined Patent Application Publication Nos. 05-43661 and 2002-226675 can be used. The sealing material manufactured by such a method can be used as a sealing and impregnating molding material for electrical and electronic parts. More specifically, a bisphenol F type epoxy resin, an aliphatic epoxy resin, an acid anhydride curing agent such as methyl hexahydrophthalic anhydride, and spherical fused silica powder are uniformly mixed, and the coated particle of the present embodiment is further added thereto, followed by uniformly mixing to obtain a sealing material.

Examples of the coating material include an over-coating material of a flexible printed wiring board, a coating material for interlayer insulation of a printed substrate, and an electromagnetic wave absorber. The coating material of the present invention can be used for, for example, a flexible printed wiring board and a multilayer printed wiring board. Examples of the method for manufacturing the coating material include the methods described in Japanese Examined Patent Publication No. 4-6116 and Japanese Unexamined Patent Application Publication Nos. 07-304931, 08-64960, and 2003-246838. More specifically, for example, silica is selected as a filler from filling materials and is mixed with, for example, a bisphenol A type epoxy resin, a phenoxy resin, and a rubber-modified epoxy resin. The mixture is then mixed with the coated particle of the present embodiment and is dissolved in methyl ethyl ketone (MEK) to prepare a 50 mass % solution. The solution is coated on a polyimide film at a thickness of 50 μm, and copper foil is stacked thereon and laminated at 60° C. to 150° C., followed by heat curing at 180° C. to 200° C. to obtain a laminate sheet in which the interlayer is coated with an epoxy resin composition.

Examples of the vibration damping material and the acoustic insulating material include a sheet-like vibration damping material, a coating type damping material, a coating type acoustic insulating material, and an acoustic insulating material component. The vibration damping material and the acoustic insulating material of the present invention are useful as materials for suppressing the vibration and sound of, for example, automobiles, ships, aircraft, railways, electric appliances, industrial machines, and building materials.

Examples of the filling material include a foam filling material and a coating filling material. The filling material of the present invention is useful as a filling material for automobile body frames and also useful for improving strength, absorbing shock, and the repairment and reinforcement of, for example, ships, aircraft, railways, electric appliances, industrial machines, and building materials.

Examples of the paint include a powder paint and a liquid paint. The paint of the present invention can be used for, for example, anticorrosion, coating of the inner and outer surfaces of pipes, home electric appliances, electrical and electronic parts, and automobile parts.

Examples of the method for manufacturing the paint include the methods described in Japanese Unexamined Patent Application Publication Nos. 11-323247 and 2005-113103. More specifically, a bisphenol A type epoxy resin is mixed with, for example, titanium oxide or talc, and the mixture is added to, stirred, and mixed with a solvent mixture of methyl isobutyl ketone (MIBK)/xylene of 1:1 (mass ratio) to prepare a main agent. The coated particle of the present embodiment is added to and uniformly dispersed in the main agent to obtain a paint.

As a further aspect of the present invention, it is possible to provide a sheet-like material characterized by containing the epoxy resin composition of the present invention. The sheet-like material of the present invention is characterized by including a support and a resin composition layer disposed on the support and containing the resin composition of the present invention. Examples of the support include a film made of a plastic material, metal foil, and release paper.

When a film made of a plastic material is used as the support, examples of the plastic material include polyesters, such as polyethylene terephthalate (hereinafter may be abbreviated to "PET") and polyethylene naphthalate (hereinafter may be abbreviated to "PEN"); polycarbonate (hereinafter may be abbreviated to "PC"); acrylic, such as polymethyl methacrylate (PMMA); cyclic polyolefin, triacetyl cellulose (TAC), polyether sulfide (PES), polyether ketone, and polyimide.

When metal foil is used as the support, examples of the metal foil include copper foil and aluminum foil, and copper foil is preferred. The copper foil may be foil made of a single metal of copper or an alloy of copper and another metal (for example, tin, chromium, silver, magnesium, nickel, zirconium, silicon, or titanium).

In addition, as the support, a support having a release layer on the surface to be joined with the resin composition layer may be used.

The sheet-like material of the present invention can be manufactured by, for example, preparing resin varnish by dissolving a resin composition in an organic solvent, applying the resin varnish onto a support using a die coater, and further drying the resin varnish to form a resin composition layer. The drying may be performed by a known method, such as heating and hot-air blowing.

In the sheet-like material, a protective film conforming to the support can be further laminated on the surface of the resin composition layer not being joined with the support (i.e., the surface on the opposite side to the support).

As a further aspect of the present invention, it is possible to provide a composite material characterized by containing the epoxy resin composition of the present invention. Examples of the composite material include a composite material that is used in a resin transfer molding method, a composite material that is used in a filament winding method, and a prepreg.

The fiber base material used in the prepreg is not particularly limited, and materials that are usually used as prepreg base materials, such as glass cloth, carbon fiber, aramid nonwoven fabric, and liquid crystal polymer nonwoven fabric, can be used.

The prepreg can be manufactured by a known method, such as a hot melt method or a solvent method.

Examples of the method for manufacturing the resin for composite material include the methods described in Japanese Unexamined Patent Application Publication Nos. 2009-102563, 2010-100730, and 2013-18804. More specifically, a bisphenol A type epoxy resin and an acid anhydride curing agent such as methyl nadic anhydride or methyl tetrahydrophthalic anhydride are uniformly mixed, and the coated particle of the present invention is further added thereto, followed by uniformly mixing to obtain a resin for a composite material.

<Characteristics of Coated Particle>

The coated particle of the present invention can impart excellent storage stability and heat stability to an epoxy resin composition, while maintaining the solubility of the urea compound during heating and the fluidity after dissolution of the urea compound.

The storage stability of an epoxy resin composition can be evaluated by, for example, storing the epoxy resin composition under predetermined conditions, for example, at a temperature of 40° C., and measuring the rate of increase in the viscosity of the composition after storage with respect to the viscosity of the composition before storage. The viscosity can be measured using a commercially available viscosity measuring apparatus, for example, an RE80 type viscometer (manufactured by Toki Sangyo Co., Ltd., cone rotor: 1.34°×R24). A lower rate of increase in viscosity means excellent storage stability.

The heat stability of an epoxy resin composition can be evaluated by, for example, heating the epoxy resin composition under predetermined conditions, for example, at a temperature of 60° C. for a predetermined time, and measuring the rate of increase in the viscosity of the composition after heating with respect to the viscosity of the composition before heating. The viscosity can be measured using a commercially available viscosity measuring apparatus, for example, an RE80 type viscometer (manufactured by Toki Sangyo Co., Ltd., cone rotor: 1.34°×R24). A lower rate of increase in viscosity means excellent heat stability.

EXAMPLES

The present invention will now be more specifically described based on Examples and Comparative Examples but is not limited to the following Examples. In Manufacturing Examples, "part(s) by mass" is based on the mass of an active component (urea compound-containing epoxy resin curing agent particle (A) or Group 4 or Group 13 element-containing compound (B)) in a product.

Manufacturing Example 1

Titanium tetraisopropoxide (Orgatix TA-8, manufactured by Matsumoto Fine Chemical Co., Ltd., 1 part by mass) was dropwise added to an aromatic dimethylurea compound (U-CAT3512T, manufactured by San-Apro Ltd., 10 parts by mass), followed by sufficiently stirring and mixing with a mill (IFM-780WG, manufactured by Iwatani Corporation) for 24 seconds to obtain a coated particle A.

Manufacturing Example 2

A coated particle B was obtained as in Manufacturing Example 1 except that the titanium tetraisopropoxide (Orgatix TA-8, manufactured by Matsumoto Fine Chemical Co., Ltd.) was changed to tetra-t-butyl titanate (Orgatix TA-80, manufactured by Matsumoto Fine Chemical Co., Ltd.).

Manufacturing Example 3

A coated particle C was obtained as in Manufacturing Example 1 except that the titanium tetraisopropoxide (Orgatix TA-8, manufactured by Matsumoto Fine Chemical Co., Ltd.) was changed to titanium tetra-n-butoxide (Orgatix TA-21, manufactured by Matsumoto Fine Chemical Co., Ltd.).

Manufacturing Example 4

A coated particle D was obtained as in Manufacturing Example 1 except that the titanium tetraisopropoxide (Orgatix TA-8, manufactured by Matsumoto Fine Chemical Co., Ltd.) was changed to titanium diisopropoxy bis(acetylacetonate) (Orgatix TC-100, manufactured by Matsumoto Fine Chemical Co., Ltd.).

Manufacturing Example 5

A coated particle E was obtained as in Manufacturing Example 1 except that the titanium tetraisopropoxide (Orgatix TA-8, manufactured by Matsumoto Fine Chemical Co., Ltd.) was changed to aluminum bisethylacetoacetate monoacetylacetonate (Orgatix AL-3200, manufactured by Matsumoto Fine Chemical Co., Ltd.).

Manufacturing Example 6

A coated particle F was obtained as in Manufacturing Example 1 except that the titanium tetraisopropoxide (Orgatix TA-8, manufactured by Matsumoto Fine Chemical Co., Ltd.) was changed to titanium isostearate (Orgatix TC-800, manufactured by Matsumoto Fine Chemical Co., Ltd.)

Manufacturing Example 7

A coated particle G was obtained as in Manufacturing Example 1 except that the titanium tetraisopropoxide (Orgatix TA-8, manufactured by Matsumoto Fine Chemical Co., Ltd.) was changed to zirconium octylate compound (Orgatix ZC-200, manufactured by Matsumoto Fine Chemical Co., Ltd.).

Manufacturing Example 8

A coated particle H was obtained as in Manufacturing Example 1 except that the titanium tetraisopropoxide (Orgatix TA-8, manufactured by Matsumoto Fine Chemical Co., Ltd.) was changed to triethyl borate (manufactured by Tokyo Chemical Industry Co., Ltd.).

Manufacturing Example 9

A coated particle I was obtained as in Manufacturing Example 8 except that the amount of the triethyl borate (manufactured by Tokyo Chemical Industry Co., Ltd.) was changed from 1 part by mass to 0.5 parts by mass.

Manufacturing Example 10

A coated particle J was obtained as in Manufacturing Example 8 except that the amount of the triethyl borate (manufactured by Tokyo Chemical Industry Co., Ltd.) was changed from 1 part by mass to 0.25 parts by mass.

Manufacturing Example 11

A coated particle K was obtained as in Manufacturing Example 8 except that the aromatic dimethylurea compound (U-CAT3512T, manufactured by San-Apro Ltd.) was changed to toluene bis dimethylurea (Technicure TDU-200M, manufactured by A&C Catalysts, Inc.).

Manufacturing Example 12

A coated particle L was obtained as in Manufacturing Example 11 except that the amount of the triethyl borate (manufactured by Tokyo Chemical Industry Co., Ltd.) was changed from 1 part by mass to 0.5 parts by mass.

Manufacturing Example 13

A coated particle M was obtained as in Manufacturing Example 11 except that the amount of the triethyl borate (manufactured by Tokyo Chemical Industry Co., Ltd.) was changed from 1 part by mass to 0.25 parts by mass.

Manufacturing Example 14

A coated particle N was obtained as in Manufacturing Example 8 except that the aromatic dimethylurea compound (U-CAT3512T, manufactured by San-Apro Ltd.) was changed to dimethyl aminocarboxyl aminomethyl trimethyl cyclohexyl dimethylurea (Technicure IPDU-8, manufactured by A&C Catalysts, Inc.).

Manufacturing Example 15 (Comparative Example)

A coated particle O was obtained as in Manufacturing Example 8 except that the aromatic dimethylurea compound (U-CAT3512T, manufactured by San-Apro Ltd.) was changed to an imidazole-adduct latent curing agent (Amicure PN-50J, manufactured by Ajinomoto Fine-Techno Co., Ltd.).

Manufacturing Example 16 (Comparative Example)

A coated particle P was obtained as in Manufacturing Example 1 except that the titanium tetraisopropoxide (Orgatix TA-8, manufactured by Matsumoto Fine Chemical Co., Ltd.) was changed to an alkoxysilane oligomer (KR-517, manufactured by Shin-Etsu Chemical Co., Ltd.).

The average particle diameters of a curing agent particle before coating and the resulting coated particle were measured using a laser diffraction particle size analyzer (SALD-2200, manufactured by Shimadzu Corporation). The measurement sample was prepared by putting a solvent that was prepared by adding 2% of a polyester dispersant SB003 to cyclohexane in a batch cell and dropping a solution that was previously prepared by adding 0.2 g of a curing agent particle before coating or a coated particle to 10 g of a solvent and performing ultrasonic dispersion for 5 minutes to the batch cell while measuring the intensity of the diffracted light to adjust the concentration to 40% to 60%. The results are shown in Table 1.

Examples 1 to 14 and Comparative Examples 1 to 6

Each resin composition was obtained by adding, to 100 parts by mass of a liquid epoxy resin (jER828EL, manufactured by Mitsubishi Chemical Corporation, epoxy equivalent: 190), 20 parts by mass of any of the coated particles A to N (Examples 1 to 14) or the coated particle O (Comparative Example 1), coated particle P (Comparative Example 2), an uncoated aromatic dimethylurea compound (U-CAT3512T, manufactured by San-Apro Ltd.) (Comparative Example 3), uncoated toluene bis dimethylurea (Technicure TDU-200M, manufactured by A&C Catalysts, Inc.) (Comparative Example 4), uncoated dimethyl aminocarboxyl aminomethyl trimethyl cyclohexyl dimethylurea (Technicure IPDU-8, manufactured by A&C Catalysts, Inc.) (Comparative Example 5), or an uncoated imidazole-adduct latent curing agent (Amicure PN-50J, manufactured by Ajinomoto Fine-Techno Co., Ltd.) (Comparative Example 6) and stirring the mixture with a revolution/rotation-type hybrid mixer (ARE-250 "Awatori Rentaro", manufactured by Thinky Corporation).

<Evaluation>

[40° C. Storage Stability]

A cone rotor (rotor code No. 6: 3°×R9.7) was mounted on an RE80 type viscometer (manufactured by Toki Sangyo Co., Ltd.), and 0.2 to 0.3 mL of a resin composition was weighed with a syringe and was placed in the measurement chamber of the viscometer set at 25° C. The number of rotations of the rotor was set to 20 rpm, and the viscosity was measured after rotations for 120 seconds and was defined as the initial viscosity (unit: Pa·s). The resin composition was stored under conditions of 40° C. for 1 week, and the viscosity was then measured by the same method as that of the initial viscosity. The multiple of the initial viscosity was determined by the following expression:

Multiple(times) of initial viscosity=(viscosity after 1 week at 40° C.)/(initial viscosity immediately after production of resin composition).

The lower the multiple of the initial viscosity, the better the storage stability at 40° C.

[60° C. Heat Stability]

A cone rotor (rotor code No. 6: 3°×R9.7) was mounted on an RE80 type viscometer (manufactured by Toki Sangyo Co., Ltd.), and 0.2 to 0.3 mL of a resin composition was weighed with a syringe and was placed in the measurement chamber of the viscometer set at 25° C. The number of rotations of the rotor was set to 20 rpm, and the viscosity was measured after rotations for 120 seconds and was defined as the initial viscosity (unit: Pa·s). The resin composition was heated under conditions of 60° C. for 16 hours, and the viscosity was then measured by the same method as that of the initial viscosity. The multiple of the initial viscosity was determined by the following expression:

Multiple(times) of initial viscosity=(viscosity after at 60° C. for 16 hours)/(initial viscosity immediately after production of resin composition).

The lower the multiple of the initial viscosity, the better the heat stability at 60° C.

[Curing Agent Solubility During Heating at 160° C. and Fluidity after Dissolution of Curing Agent]

A 12-mL aluminum foil dish in which 0.2 mL of a resin composition was weighed with a syringe was placed on a gelation tester (IM-AOE1 type, manufactured by Imoto Machinery Co. Ltd.) set at 160° C., and the solubility of the curing agent particle was visually verified. A resin composition in which the particles were not completely seen within 5 minutes was defined as "soluble", a resin composition in which the particles were not dissolved at all and remained was defined as "insoluble", and a resin composition in which the particles were partially dissolved and partially remained was defined as "remaining without being dissolved". In addition, a resin composition that could be stirred with a spatula for 30 seconds or more after the dissolution of the curing agent was defined as having "fluidity present", a resin composition that lost its fluidity and could not be stirred with a spatula within 30 seconds after complete dissolution of the curing agent or lost its fluidity before complete dissolution of the curing agent and could not be stirred with a spatula was defined as having "fluidity absent".

Table 1 shows the results of the evaluation of storage stability and heat stability of the epoxy resin compositions of Examples 1 to 14 and Comparative Examples 1 to 6 and the solubility of coated particles in the epoxy resin compositions during heating and the fluidity of the epoxy resin compositions.

TABLE 1

| | Coated particle or uncoated curing agent | Curing agent (A) | Group 4 or Group 13 element-containing compound (B) | Amount (parts by mass) of (B) relative to 100 parts by mass of (A) | 40° C. storage stability | 60° C. heat stability |
| --- | --- | --- | --- | --- | --- | --- |
| Example 1 | Coated particle A | U-CAT3512T | Orgatix TA-8 | 10 | 1.5 | 3.7 |
| Example 2 | Coated particle B | | Orgatix TA-80 | 10 | 1.7 | 3.6 |
| Example 3 | Coated particle C | | Orgatix TA-21 | 10 | 1.6 | 2.6 |
| Example 4 | Coated particle D | | Orgatix TC-100 | 10 | 1.2 | 1.4 |
| Example 5 | Coated particle E | | Orgatix AL-3200 | 10 | 2.0 | 4 |
| Example 6 | Coated particle F | | Orgatix TC-800 | 10 | 1.1 | 1.3 |
| Example 7 | Coated particle G | | Orgatix ZC-200 | 10 | 1.4 | 2.1 |
| Example 8 | Coated particle H | | Triethyl borate | 10 | 1.2 | 1.3 |
| Example 9 | Coated particle I | | | 5 | 1.1 | 1.2 |
| Example 10 | Coated particle J | | | 2.5 | 1.1 | 1.3 |
| Example 11 | Coated particle K | Technicure TDU-200M | | 10 | 1.2 | 1.4 |
| Example 12 | Coated particle L | | | 5 | 1.2 | 1.4 |
| Example 13 | Coated particle M | | | 2.5 | 1.2 | 2.8 |
| Example 14 | Coated particle N | Technicure IPDU-8 | Triethyl borate | 10 | 1.0 | 1.3 |
| Comparative Example 1 | Coated particle O | Amicure PN-50J | | 10 | 1.0 | 1.2 |
| Comparative Example 2 | Coated particle P | U-CAT3512T | KR-517 | 10 | Cured | Cured |
| Comparative Example 3 | | U-CAT3512T | — | — | Cured | Cured |

TABLE 1-continued

| | | | | | | |
|---|---|---|---|---|---|---|
| Comparative Example 4 | Technicure TDU-200M | Technicure TDU-200M | — | — | Cured | Cured |
| Comparative Example 5 | Technicure IPDU-8 | Technicure IPDU-8 | — | — | 1.0 | Cured |
| Comparative Example 6 | Amicure PN-50J | Amicure PN-50J | — | — | 1.0 | 11.6 |

| | Average particle diameter of curing agent (A) | Average particle diameter of coated particle | Solubility of curing agent heated at 160° C. | Fluidity after dissolution of curing agent |
|---|---|---|---|---|
| Example 1 | 13.8 | 13.4 | Soluble | Present |
| Example 2 | 13.8 | 11.3 | Soluble | Present |
| Example 3 | 13.8 | 20.7 | Soluble | Present |
| Example 4 | 13.8 | 24.8 | Soluble | Present |
| Example 5 | 13.8 | 11.4 | Soluble | Present |
| Example 6 | 13.8 | 10.3 | Soluble | Present |
| Example 7 | 13.8 | 11.1 | Soluble | Present |
| Example 8 | 13.8 | 12.6 | Soluble | Present |
| Example 9 | 13.8 | 13.6 | Soluble | Present |
| Example 10 | 13.8 | 12.3 | Soluble | Present |
| Example 11 | 7.2 | 12.7 | Soluble | Present |
| Example 12 | 7.2 | 7.7 | Soluble | Present |
| Example 13 | 7.2 | 7.3 | Soluble | Present |
| Example 14 | 17.6 | 18.0 | Soluble | Present |
| Comparative Example 1 | 3.0 | 18.3 | Insoluble | Absent |
| Comparative Example 2 | 13.8 | 13.6 | Soluble | Present |
| Comparative Example 3 | 13.8 | — | Soluble | Present |
| Comparative Example 4 | 7.2 | — | Soluble | Present |
| Comparative Example 5 | 17.6 | — | Soluble | Present |
| Comparative Example 6 | 3.0 | — | Remaining without being dissolved | Absent |

As demonstrated by the table, the epoxy resin compositions containing the coated particles A to N of the present invention (Examples 1 to 14) had excellent storage stability and heat stability, compared to the epoxy resin compositions containing urea compound particles having uncoated surfaces (Comparative Examples 3 to 5). In the epoxy resin composition containing coated particle P which was a urea compound coated with an alkoxysilane oligomer (Comparative Example 2), the storage stability and the heat stability were not improved compared to the epoxy resin compositions of Comparative Examples 3 to 5. In addition, it was demonstrated that in the coated particles A to N (Examples 1 to 14) of the present invention, although the particle surfaces were coated with the Group 4 or Group 13 element-containing compound (B), the solubility in the epoxy resin during heating was excellent, and the fluidity of the epoxy resin composition was excellent, as in the urea compound particles having uncoated surfaces (Comparative Examples 3 to 5).

INDUSTRIAL APPLICABILITY

The coated particle of the present invention can be suitably used as an epoxy resin curing agent or a curing accelerator, such as FRP matrix resin. The resin composition including a coated particle and an epoxy resin of the present invention can be used, for example, as an epoxy resin material in various fields such as construction, civil engineering, automobiles, ships, aerospace, industrial machines, robots, communications, electrical and electronic, semiconductors, and displays, and can be used as, for example, an adhesive, a binder, an electrically conductive material, a magnetic material, a thermally conductive material, an insulating material, a sealing material, a coating material, or a paint.

The invention claimed is:

1. A coated particle comprising a urea compound-containing epoxy resin curing agent particle (A) and a Group 4 or Group 13 element-containing compound (B) coating a surface of the particle, wherein the Group 4 or Group 13 element-containing compound is at least one selected from the group consisting of an alkoxide compound, a chelate compound, and an acylate compound, wherein the Group 4 or Group 13 element-containing compound (B) includes
  (a) a compound represented by formula (1): $D(OR^1)_n$
  wherein in formula (1),
  D is a Group 4 or Group 13 element,
  when D is a Group 4 element, n is 4,
  when D is a Group 13 element, n is 3, and
  in each of n $OR^1$s, $R^1$ is independently,
  (i) a linear or branched saturated or unsaturated C1-20 hydrocarbon group,
  (ii) an acyl group represented by formula (1a): $COR^2$, wherein in formula (1a), $R^2$ is a linear or branched saturated or unsaturated C1-20 hydrocarbon group, or
  (iii) a group represented by formula (1b): $R^3C(O)R^4$, wherein in formula (1b), $R^3$ is a linear or branched saturated or unsaturated C1-4 hydrocarbon group, and $R^4$ is $R^5$ or $OR^5$, where $R^5$ is a linear or branched saturated or unsaturated C1-20 hydrocarbon group; and $OR^1$ is coordinate-bonded to D through a carbonyl group in the formula (1b) to form the following cyclic structure (1c):

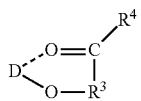

(1c)

wherein in formula (1c), the dotted line indicates a coordinate bond, (b) a compound represented by formula (2):

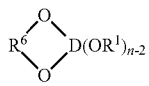

(2)

wherein in formula (2), D, n, and $R^1$ are the same as those defined in formula (1), and $R^6$ is a linear or branched saturated or unsaturated C1-20 hydrocarbon group; or (c) a 2- to 10-mer of a compound represented by the formula (1) and/or a compound represented by the formula (2).

2. The coated particle according to claim 1, wherein the Group 4 or Group 13 element in the Group 4 or Group 13 element-containing compound (B) is selected from the group consisting of boron, aluminum, titanium, and zirconium.

3. The coated particle according to claim 2, wherein the Group 4 or Group 13 element in the Group 4 or Group 13 element-containing compound (B) is boron or titanium.

4. The coated particle according to claim 1, wherein the urea compound is at least one selected from the group consisting of aromatic dimethylureas and aliphatic dimethylureas.

5. The coated particle according to claim 1, wherein
the cyclic structure (1c) is represented by the following cyclic structure (1d):

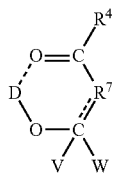

(1d)

wherein in formula (1d), $R^7$ is a single bond or a linear or branched saturated or unsaturated C1-3 hydrocarbon group that is optionally substituted with one or more $R^8$s, where $R^8$ is a linear or branched saturated or unsaturated C1-20 hydrocarbon group, V is $R^9$ or $OR^9$, where $R^9$ is a hydrogen atom or a linear or branched saturated or unsaturated C1-20 hydrocarbon group, and ═══ means a single bond or a double bond, where when ═══ means a single bond, W is $R^9$ or $OR^9$, and when ═══ means a double bond, W is not present.

6. An epoxy resin composition comprising the coated particle according to claim 1 and an epoxy resin.

7. An adhesive comprising the epoxy resin composition according to claim 6.

8. A method for manufacturing the coated particle according to claim 1, the method comprising a step of mixing a urea compound-containing epoxy resin curing agent particle (A) and at least one selected from the group consisting of Group 4 or Group 13 element-containing alkoxide, chelate, and acylate compounds (B), wherein the Group 4 or Group 13 element-containing compound (B) includes (a) a compound represented by formula (1): $D(OR^1)_n$
wherein in formula (1),
D is a Group 4 or Group 13 element,
when D is a Group 4 element, n is 4,
when D is a Group 13 element, n is 3, and
in each of n $OR^1$s, $R^1$ is independently,
  (i) a linear or branched saturated or unsaturated C1-20 hydrocarbon croup,
  (ii) an acyl group represented by formula (1a): $COR^2$,
    wherein in formula (1a), $R^2$ is a linear or branched saturated or unsaturated C1-20 hydrocarbon group, or
  (iii) a group represented by formula (1b): $R^3C(O)R^4$,
    wherein in formula (1b), $R^3$ is a linear or branched saturated or unsaturated C1-4 hydrocarbon group, and $R^4$ is $R^5$ or $OR^5$, where $R^5$ is a linear or branched saturated or unsaturated C1-20 hydrocarbon group; and $OR^1$ is coordinate-bonded to D through a carbonyl group in the formula (1b) to form the following cyclic structure (1c):

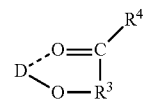

(1c)

wherein in formula (1c), the dotted line indicates a coordinate bond, (b) a compound represented by formula (2):

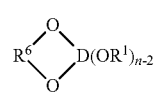

(2)

wherein in formula (2), D, n, and $R^1$ are the same as those defined in formula (1), and $R^6$ is a linear or branched saturated or unsaturated C1-20 hydrocarbon group; or (c) a 2- to 10-mer of a compound represented by the formula (1) and/or a compound represented by the formula (2).

9. A method for coating an epoxy resin curing agent particle, the method comprising a step of coating a surface of a urea compound-containing epoxy resin curing agent particle (A) with at least one selected from the group consisting of Group 4 or Group 13 element-containing alkoxide, chelate, and acylate compounds (B), wherein the Group 4 or Group 13 element-containing compound (B) includes (a) a compound represented by formula (1): $D(OR^1)_n$
wherein in formula (1),
D is a Group 4 or Group 13 element,
when D is a Group 4 element, n is 4,
when D is a Group 13 element, n is 3, and
in each of n $OR^1$s, $R^1$ is independently, (i) a linear or branched saturated or unsaturated C1-20 hydrocarbon group,
(ii) an acyl group represented by formula (1a): COR², wherein in formula (1a), R² is a linear or branched saturated or unsaturated C1-20 hydrocarbon group, or
(iii) a group represented by formula (1b): R³C(O)R⁴, wherein in formula (1b), R³ is a linear or branched saturated or unsaturated C1-4 hydrocarbon group, and R⁴ is R⁵ or OR⁵, where R⁵ is a linear branched saturated or unsaturated C1-20 hydrocarbon group: and OR¹ is coordinate-bonded to D through a carbonyl group in the formula (1b) to form the following cyclic structure (1c):

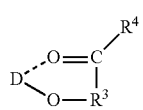

(1c)

wherein in formula (1c), the dotted line indicates a coordinate bond,
(b) a compound represented by formula (2):

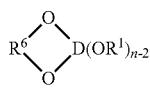

(2)

wherein in formula (2), D, n, and R¹ are the same as those defined in formula (1), and R⁶ is a linear or branched saturated or unsaturated C1-20 hydrocarbon group; or
(c) a 2- to 10-mer of a compound represented by the formula (1) and/or a compound represented by the formula (2).

10. The method according to claim 9, wherein the Group 4 or Group 12 element in the Group 4 or Group 13 element-containing compound (B) is selected from the group consisting f boron, aluminum, titanium, and zirconium.

11. The method according to claim 10, wherein the Group 4 or Group 13 element in the Group 4 or Group 13 element-containing compound (B) is boron or titanium.

12. The method according to claim 8, wherein the urea compound is at least one selected from the group consisting of aromatic dimethylureas and aliphatic dimethylureas.

13. The method according to claim 8, wherein the cyclic structure (1c) is represented by the following cyclic structure (1d):

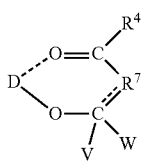

(1d)

wherein in formula (1d),
R⁷ is a single bond or a linear or branched saturated or unsaturated C1-3 hydrocarbon group that is optionally substituted with one or more R⁸s, where R⁸ is a linear or branched saturated or unsaturated C1-20 hydrocarbon group,
V is R⁹ or OR⁹, where R⁹ is a hydrogen atom or a linear or branched saturated or unsaturated C1-20 hydrocarbon group, and

-------- means a single bond or a double bond, where
when ========
means a single bond, W is R⁹ or OR⁹, and
when ═══
means a double bond, W is not present.

14. The method according to claim 9, wherein the Group 4 or Group 13 element in the Group 4 or Group 13 element-containing compound (B) is selected from the group consisting of boron, aluminum, titanium, and zirconium.

15. The method according to claim 14, wherein the Group 4 or Group 13 element in the Group 4 or Group 13 element-containing compound (B) is boron or titanium.

16. The method according to claim 9, wherein the urea compound is at least one selected from the group consisting of aromatic dimethylureas and aliphatic dimethylureas.

17. The method according to claim 9, wherein the cyclic structure (1c) is represented by the following cyclic structure (1d):

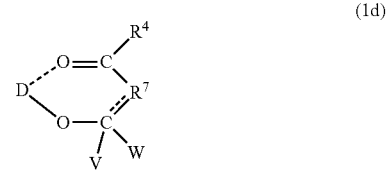

(1d)

wherein in formula (1d),
R⁷ is a single bond or a linear or branched saturated or unsaturated C1-3 hydrocarbon group that is optionally substituted with one or more R⁸s, where R⁸ is a linear or branched saturated or unsaturated C1-20 hydrocarbon group,
V is R⁹ or OR⁹, where R⁹ is a hydrogen atom or a linear or brandied saturated or unsaturated C1-20 hydrocarbon group, and ═══
means a single bond or a double bond, where
when ═══
means a single bond, W is R⁹ or OR⁹, and
when ═══
means a double bond, W is not present.

* * * * *